(12) United States Patent
Izutsu et al.

(10) Patent No.: US 6,773,555 B1
(45) Date of Patent: Aug. 10, 2004

(54) METHOD FOR TREATING EXHAUST GAS

(75) Inventors: Masahiro Izutsu, Tokyo (JP); Ryoji Suzuki, Tokyo (JP); Shinji Aoki, Tokyo (JP); Daisuke Saku, Tokyo (JP); Kazuaki Hayashi, Tokyo (JP)

(73) Assignee: Ebara Corporation, Tokyo (JP)

(*) Notice: Subject to any disclaimer, the term of this patent is extended or adjusted under 35 U.S.C. 154(b) by 0 days.

(21) Appl. No.: 10/048,489

(22) PCT Filed: Aug. 14, 2000

(86) PCT No.: PCT/JP00/05447
§ 371 (c)(1),
(2), (4) Date: Feb. 12, 2002

(87) PCT Pub. No.: WO01/12299
PCT Pub. Date: Feb. 22, 2001

(30) Foreign Application Priority Data

Aug. 12, 1999 (JP) .......................................... 11-228776
Oct. 28, 1999 (JP) .......................................... 11-306370
Feb. 23, 2000 (JP) .......................................... 2000-045292
Mar. 31, 2000 (JP) .......................................... 2000-096607

(51) Int. Cl.$^7$ .......................... B01D 53/00; C01B 17/96
(52) U.S. Cl. .............................. 204/157.3; 204/157.49; 423/243.02
(58) Field of Search ............................ 204/157.3, 164, 204/157.495; 423/243.02, 243.06, 545

(56) References Cited

U.S. PATENT DOCUMENTS

| | | | |
|---|---|---|---|
| 4,541,999 A | * 9/1985 | Bechthold et al. .......... 423/235 |
| 4,853,193 A | * 8/1989 | Cahn et al. ................... 423/235 |
| 5,244,552 A | 9/1993 | Namba et al. ........... 204/157.3 |
| 5,834,722 A | 11/1998 | Tokunaga et al. ......... 204/157.3 |
| 6,093,288 A | 7/2000 | Izutsu et al. ............. 204/157.3 |
| 6,179,968 B1 | 1/2001 | Izutsu et al. ............. 204/157.3 |
| 6,355,084 B1 | * 3/2002 | Izutsu et al. ............. 204/157.3 |

FOREIGN PATENT DOCUMENTS

| | | |
|---|---|---|
| JP | 53-135880 | 11/1978 |
| JP | 54-25262 | 2/1979 |
| JP | 63-252527 A | 10/1988 |
| JP | 6-126127 A | 5/1994 |
| JP | 10-66826 A | 3/1998 |
| JP | 11-207142 A | 8/1999 |

* cited by examiner

Primary Examiner—Wayne A. Langel
(74) Attorney, Agent, or Firm—Oblon, Spivak, McClelland, Maier & Neustadt, P.C.

(57) ABSTRACT

The present invention relates to a flue gas treatment method and apparatus for removing sulfur oxides by injecting ammonia into flue gas containing sulfur oxides. In the flue gas treatment method for removing sulfur oxides contained in the flue gas using ammonia, the present invention is characterized in that ammonia is injected into the flue gas containing sulfur oxides to react sulfur oxides with ammonia to produce ammonium compounds containing ammonium sulfate, and after recovering the produced ammonium compounds from the flue gas, the flue gas is brought into contact with an absorption liquid to remove residual sulfur oxides and/or ammonia contained in the flue gas.

7 Claims, 14 Drawing Sheets

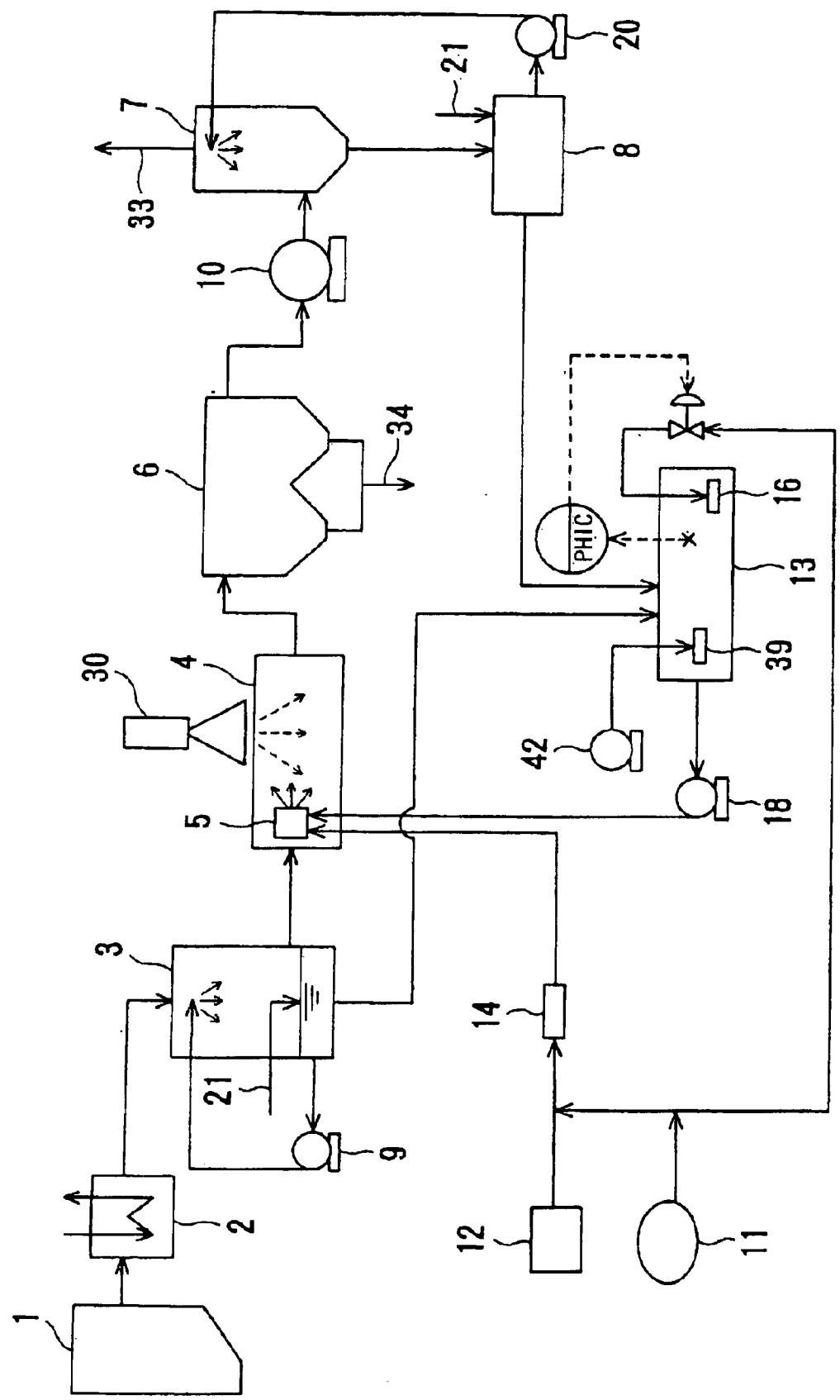
F I G. 5

METHOD FOR TREATING EXHAUST GAS

TECHNICAL FIELD

The present invention relates to a treatment of flue gas containing sulfur oxides, more particularly to a flue gas treatment method and apparatus for removing sulfur oxides by injecting ammonia into flue gas containing sulfur oxides.

BACKGROUND ART

As economy develops, more and more energy is demanded. In such circumstances, an energy source is still dependent on fossil fuels such as coal and petroleum. However, harmful products or pollutants generated by burning of fossil fuels are responsible for environmental pollution. To prevent the diffusion of pollutants such as sulfur oxides and nitrogen oxides into the atmosphere and the progress of environmental pollution, development work of a fuel gas treatment system is being carried out for a fuel combustion plant such as a power plant. However, in the conventional flue gas treatment system, there are still many areas of improvement to meet problems such as the need for the equipment requiring complicated control and the indispensability for large-scale waste water treatment systems.

In order to solve these problems, a flue gas desulfurizing process in which flue gas discharged from the combustion facility such as a boiler is treated by injecting ammonia into the flue gas has been developed.

In the flue gas desulfurizing process in which ammonia ($NH_3$) is injected into flue gas containing sulfur oxides ($SO_X$) such as combustion gas discharged from a boiler (hereinafter referred to as an ammonia injection process), $NH_3$ reacts with $SO_X$ to produce a powder of ammonium compounds containing ammonium sulfate. Among reactions in the ammonia injection process, a chemical reaction in which sulfur dioxides ($SO_2$) as a main component of $SO_X$ reacts with $NH_3$, oxygen ($O_2$) and water ($H_2O$) contained in flue gas to produce ammonium sulfate [$(NH_4)_2SO_4$] as by-product is expressed in the following formula (1).

$$SO_2+2NH_3+H_2O+1/2O_2 \rightarrow (NH_4)_2SO_4+550.1KJ/mol \quad (1)$$

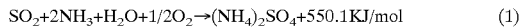

As expressed in the formula (1) representatively, because the reaction in which $SO_X$ reacts with $NH_3$ to produce ammonium compounds is an exothermic reaction, the lower the temperature of flue gas, the more accelerated the reaction is. Therefore, in the ammonia injection process, flue gas is cooled before injection of $NH_3$, or water is sprayed into flue gas before, or simultaneously with, or after injection of $NH_3$; or after mixing with $NH_3$. In this case, the injected water is consumed by the desulfurizing reaction representatively expressed in the formula (1), and evaporated by the heat of reaction, and the sensible heat possessed by flue gas before injection of ammonia. Thus, if the amount of sprayed water is adjusted appropriately, the recovery of the produced ammonium compounds in the form of powder is not hindered. The recovery of the powder is normally carried out in an electrostatic precipitator, and the recovered powder comprises ammonium compounds such as ammonium sulfate and can be utilized as a fertilizer.

However, in the ammonia injection process, generally, efficiency of removing $SO_X$ (hereinafter referred to as desulfurization rate), especially efficiency of removing $SO_2$ is not high. Residual $NH_3$ which has injected and has not reacted with $SO_X$ is released together with the treated flue gas to the atmosphere. In order to lower leakage of $NH_3$, it is necessary to reduce the amount of injected ammonia. However, reduction of the amount of injected ammonia lowers further a desulfurization rate, particularly the efficiency of removing $SO_2$. As a result, unreacted $NH_3$ is additionally released by the amount corresponding to the lowered desulfurization rate. As a result, the problem of leakage of $NH_3$ which is not lowered by the amount corresponding to the reduced amount of injected ammonia arises.

On the other hand, the desulfurizing reaction may be accelerated by increasing the amount of water sprayed together with $NH_3$ to lower the temperature of flue gas. In this case, the temperature of the flue gas reaches around a water saturation temperature even in the vicinity of an outlet of a process vessel, and hence it becomes difficult to recover the produced powder in a dry state.

Thus, in order to achieve a high desulfurization rate, normally, $NH_3$ is sprayed and injected, and irradiation of electron beam of several kGy to dozen kGy is carried out (the flue gas desulfurizing method in which injection of $NH_3$ and irradiation of electron beam are performed is hereinafter referred to as electron beam process). The purpose of this method is that residual $SO_2$ which has not been removed in the above formula (1) is oxidized to sulfur trioxide ($SO_3$) or sulfuric acid ($H_2SO_4$) by radicals such as O, OH or $HO_2$ produced from gas molecules such as oxygen and water vapor in flue gas by irradiation of electron beam, and then the produced $SO_3$ or $H_2SO_4$ reacts with water (water vapor originally contained in the flue gas, and water sprayed and injected together with $NH_3$) and $NH_3$ by the following formulas (2) and (3) to recover ammonium sulfate.

$$SO_3+2NH_3+H_2O \rightarrow (NH_4)_2SO_4 \quad (2)$$

$$H_2SO_4+2NH_3 \rightarrow (NH_4)_2SO_4 \quad (3)$$

In order to irradiate flue gas of weight flow Q (kg/s) with electron beam having absorbed dose of D (kGy), electric power P (kW) calculated by the following formula (4) is consumed.

$$P(kW)=Q(kg/s) \times D(kGy)/(\eta(\%)/100) \quad (4)$$

where $\eta$ is the ratio of energy of electrons absorbed by the flue gas to the supplied electric power, and this $\eta$ is normally in the range of 50 to 80%.

However, generally, in the electron beam irradiating method, when a high desulfurization rate is required on the condition that leakage of $NH_3$ is controlled to a lower level, the required absorbed dose becomes large, and hence electric power consumption becomes large as expressed by the formula (4).

Therefore, the inventors of the present application have proposed a flue gas desulfurizing method and apparatus in which flue gas is cooled in the range of a water saturation temperature to 80° C., aqueous ammonia is sprayed and injected into the cooled flue gas, and the aqueous ammonia is pulverized into droplets having a Sauter mean diameter of 0.5 μm to 30 μm and sprayed, whereby a high desulfurization rate is achieved while keeping low leakage of $NH_3$ without irradiation of electron beam or with a relatively small absorbed dose.

However, even in such method, in order to obtain 90% or more of the desulfurization rate while leakage of $NH_3$ is suppressed to about 10 ppm or less, a large amount of absorbed dose of not less than about 5 kGy is required, or aqueous ammonia is required to be pulverized into droplets having a Sauter mean diameter of not more than about 5 μm. In the latter as well as the former, a large amount of energy such as energy for generating a large amount of compressed air for pulverization is necessary.

DISCLOSURE OF INVENTION

In view of the above, it is therefore an object of the present invention to provide a flue gas desulfurizing method and apparatus which can achieve a high desulfurization rate and can lower leakage of $NH_3$ while reducing the cost of energy.

In order to achieve the above object, according to the present invention, there is provided a flue gas treatment method for removing sulfur oxides in flue gas using ammonia, characterized in that: ammonia is injected into the flue gas containing sulfur oxides to react sulfur oxides with ammonia to produce ammonium compounds containing ammonium sulfate, and after recovering the produced ammonium compounds from the flue gas, the flue gas is brought into contact with an absorption liquid to remove residual sulfur oxides and/or ammonia contained in the flue gas.

In the absorption liquid, sulfate ions ($SO_4^{2-}$) and/or sulfite ions ($SO_3^{2-}$) and/or ammonium ions ($NH_4^+$) are dissolved.

In the flue gas treatment method of the present invention, the residual $SO_X$, contained in the flue gas, which has not reacted with the injected $NH_3$ and has not converted into a powder of ammonium compounds, and/or the residual $NH_3$ which has injected into the flue gas, and has not reacted with $SO_X$ and has not converted into a powder of ammonium compounds are brought into contact with an absorption liquid in which the above $SO_4^{2-}$ and/or $SO_3^{2-}$ and/or $NH_4^+$ is dissolved, and are absorbed in the absorption liquid and removed.

In the flue gas treatment method of the present invention, in the case where the flue gas treatment capability (desulfurization rate and concentration of leak ammonia) at the section of an ammonia injection process at an upstream side except a gas absorption apparatus is the same as that of the ammonia injection process only, the flue gas treatment capability of the entire flue gas treatment system including the gas absorption apparatus can be improved further than that of the ammonia injection process only. That is, the desulfurization rate of the entire flue gas treatment apparatus can be improved by absorbing and removing $SO_X$ in the gas absorption apparatus. Further, the concentration of leak ammonia in the entire flue gas treatment apparatus can be lowered by absorbing and removing $NH_3$ in the gas absorption apparatus.

When the flue gas treatment capability of the entire flue gas treatment apparatus is the same as that of the section of the ammonia injection process only, the running cost and the equipment in the section of the ammonia injection process can be significantly reduced. Specifically, the desulfurization rate which should be achieved at the section of the ammonia injection process can be lowered by absorbing and removing $SO_X$ in the gas absorption apparatus. Further, the requirement for concentration of leak ammonia at the section of the ammonia injection process can be alleviated by absorbing and removing $NH_3$ in the gas absorption apparatus. As a result, the flue gas treatment capability which has been achieved by irradiation of a relatively large amount of electron beam in the conventional technology can be achieved by irradiation of a small dose of electron beam or no irradiation of electron beam. Furthermore, the flue gas treatment capability which has been achieved by pulverizing aqueous ammonia into droplets having an extremely small Sauter mean diameter and spraying such droplets in the conventional technology can be achieved even in spraying aqueous ammonia having a relatively large diameter. In this manner, the running cost and the cost of equipment can be extremely reduced in the section of the ammonia injection process.

According to one aspect of the present invention, the absorption liquid is circulated and used while oxidizing sulfite ions dissolved in the absorption liquid. Specifically, $NH_3$ is injected into flue gas to react with $SO_X$, and the flue gas from which reaction product has been recovered is brought into contact with the absorption liquid which is circulated and used while oxidizing dissolved $SO_3^{2-}$ to $SO_4^{2-}$, thus removing $NH_3$ and $SO_X$ simultaneously.

If aqueous solution in which $NH_4^+$ and $SO_3^{2-}$ are dissolved is compared with aqueous solution in which $NH_4^+$ and $SO_4^{2-}$ are dissolved, when the molar ratio of $NH_4^+$ to $SO_3^{2-}$ is equal to the molar ratio of $NH_4^+$ to $SO_4^{2-}$, a pH of the aqueous solution in which $NH_4^+$ and $SO_4^{2-}$ are dissolved is lower than that of the aqueous solution in which $NH_4^+$ and $SO_3^{2-}$ are dissolved. For instance, in the case of $NH_4^+$: $SO_3^{2-}=NH_4^+:SO_4^{2-}=2:1$, the respective concentrations of the aqueous solution are shown in the following Table 1 according to the sum of the concentrations of the salts.

TABLE 1

| the sum of the concentrations of the salts | 0.01 g/L | 0.1 g/L | 1 g/L | 10 g/L | 50 g/L |
|---|---|---|---|---|---|
| pH | | | | | |
| $2NH_4^+ + SO_3^{2-}$ | 7.8 | 7.9 | 8.0 | 8.0 | 8.0 |
| $2NH_4^+ + SO_4^{2-}$ | 5.6 | 5.5 | 5.4 | 5.3 | 5.2 |

If the $NH_4^+$ concentration in the absorption liquid is the same, as a pH of the absorption liquid is lower, $NH_3$ in the flue gas is liable to be dissolved in the absorption liquid. Thus, the residual $NH_3$ in the flue gas from which the reaction product has been recovered can be effectively removed by oxidizing $SO_3^{2-}$ in the absorption liquid to $SO_4^{2-}$.

While one of main components of $SO_X$ which remains in the flue gas after recovering the reaction products is $SO_2$, the $SO_3^{2-}$ concentration in the absorption liquid has a great influence on absorption of $SO_2$ rather than a pH of the absorption liquid as far as the pH of the absorption liquid is not lowered remarkably. Specifically, if the pH of the absorption liquid is about 2 or more, then the removal efficiency of $SO_2$ by the absorption liquid is not much influenced by the pH of the absorption liquid. However, the removal efficiency of $SO_2$ is lowered, when the $SO_3^{2-}$ concentration is high. Thus, $SO_3^{2-}$ in the absorption liquid is oxidized to $SO_4^{2-}$ to remove $SO_2$ effectively which remains in the flue gas after recovering the reaction product. The oxidization of $SO_3^{2-}$ in the absorption liquid to $SO_4^{2-}$ is performed by, for example, diffusion of air into the absorption liquid (aeration).

According to one aspect of the present invention, the amount of the ammonia injected into the flue gas is adjusted so that a pH of the absorption liquid becomes 8 or less without supplying acid substance.

In the case where $NH_4^+$ is dissolved together with $SO_3^{2-}$ and/or $SO_4^{2-}$ in an aqueous solution, if the molar ratio of $NH_4^+$ to $SO_3^{2-}$ and/or $SO_4^{2-}$ is equal to or smaller than 2:1, then $NH_4^+$ can be in existence relatively stably as ions in the aqueous solution. Particularly, when $SO_3^{2-}$ is coexistent with $NH_4^+$, if the molar ratio of $NH_4^+$ to $SO_3^2$ becomes larger than 2:1, then $NH_4+$ in the aqueous solution can be easily liberated as $NH_3$ gas.

Therefore, if the molar ratio of $NH_4^+$ to $SO_3^{2-}$ in the absorption liquid becomes larger than 2:1, efficiency for dissolving and removing $NH_3$ in the flue gas into the absorption liquid is lowered. According to Table 1, because the pH of the absorption liquid is about 8 in the case where the molar ratio of $NH_4^+$ to $SO_3^{2-}$ is 2:1, it is preferable to adjust the pH of the absorption liquid to 8 or less in order to effectively remove $NH_3$ remaining in the flue gas from which the reaction product has been recovered.

It is possible to adjust the pH of the absorption liquid to 8 or less by supplying acid substance such as sulfuric acid into the absorption liquid. In this case, additional chemicals are necessary to remove $SO_X$ in the flue gas besides $NH_3$, and hence the running cost is increased and additional facilities such as chemical storage equipment are necessary.

It is also possible to adjust the pH of the absorption liquid to 8 or less by increasing the amount of the absorption liquid withdrawn from a gas absorption apparatus and increasing the amount of industrial water supplied to the absorption liquid in accordance with the amount of the withdrawn liquid and the amount of evaporated water in the gas absorption apparatus to lower the concentration of the salt in the absorption liquid. However, as shown in Table 1, because the suppression effect of pH obtained by lowering the concentration of the salt is extremely limited, if the pH is lowered by increasing the amount of withdrawn absorption liquid, then a large amount of the absorption liquid is required to be withdrawn, and hence the great equipment cost and running cost are required to treat the withdrawn water.

On the other hand, when flue gas which is brought into contact with the absorption liquid in the gas absorption apparatus contains not only unreacted $NH_3$ but also $SO_X$, the absorption liquid absorbs both of $NH_3$ and $SO_X$ simultaneously to increase a concentration of $NH_4$ and a concentration of $SO_3^{2-}$ and/ or $SO_4^{2-}$. Thus, the pH of the absorption liquid can be adjusted by adjusting a ratio of a concentration of $SO_X$ to a concentration of $NH_3$ adequately in the flue gas introduced into the gas absorption apparatus.

The concentrations of $SO_X$ and $NH_3$ remaining in the flue gas introduced into the gas absorption apparatus are determined by a flue gas treatment capability (desulfurization rate and concentration of leak ammonia) which is achieved at the section of the ammonia injection process at the upstream side except the gas absorption apparatus. The flue gas treatment capability achieved at the section of the ammonia injection process is determined by process variables such as the amount of ammonia to be injected, a flue gas temperature at an outlet of a process vessel, and the dose of electron beam to be irradiated, if electron beam is irradiated along with $NH_3$ injection. The most suitable process variable among the above variables for adjusting a ratio of a concentration of $SO_X$ to a concentration of $NH_3$ remaining in the flue gas is the amount of $NH_3$ to be injected. Therefore, the pH of the absorption liquid can be adjusted by the amount of $NH_3$ to be injected.

Specifically, when the amount of injected $NH_3$ is large, a rate for converting $SO_X$ into ammonium compounds containing ammonium sulfate is increased by a reaction of $SO_X$ with the injected $NH_3$ to thus decrease the concentration of the remaining $SO_X$ while the concentration of unreated $NH_3$ is increased. As a result, the amount of $SO_X$ dissolved in the absorption liquid is decreased and the amount of $NH_3$ dissolved in the absorption liquid is increased by bringing the flue gas into contact with the absorption liquid. Consequently, the pH of the absorption liquid is increased.

Conversely, when the amount of injected $NH_3$ becomes small, the concentration of $SO_X$ remaining in the flue gas which is brought into contact with the absorption liquid is lowered and the concentration of unreacted $NH_3$ is increased, thus lowering the pH of the absorption liquid. In this manner, it is possible to adjust the pH of the absorption liquid by adjusting the amount of $NH_3$ to be injected, and if the amount of $NH_3$ to be injected into the flue gas is adjusted so that the pH of the absorption liquid is adjusted to 8 or less, then the pH of the absorption liquid can be adjusted to 8 or less without additional chemicals of acid substance and without withdrawing a large amount of the absorption liquid.

As described later, alkaline substance such as $NH_3$ may be added to the absorption liquid. In such case also, it is preferable to adjust the amount of $NH_3$ to be injected into the flue gas at the section of the ammonia injection process so that the pH of the absorption liquid is adjusted to 8 or less without adding acid substance and adjust the amount of alkaline substance to be added that the pH of the absorption liquid becomes 8 or less. At this time, if the variable range of pH caused by injection of alkaline substance is considered, it is particularly preferable that the amount of $NH_3$ injected into the flue gas is adjusted so that the pH of the absorption liquid is adjusted to 7 or less without adding alkaline substance and the amount of supplied alkaline substance composed of $NH_3$ is adjusted so that the pH of the absorption liquid is adjusted to 8 or less.

According to one aspect of the present invention, the pH of the absorption liquid is adjusted by supplying ammonia into the absorption liquid. If the pH of the absorption liquid is less than 2, even though $SO_3^{2-}$ in the absorption liquid is oxidized into $SO_4^{2-}$, absorption efficiency of $SO_2$ in $SO_X$ is lowered. Accordingly, alkaline substance may be supplied into the absorption liquid. In this cage, by utilizing a part of $NH_3$ which is used for removing $SO_X$ in the flue gas, it is advantageously unnecessary to provide additional equipment such as a storage apparatus for storing alkaline substance for replenishment.

In the above flue gas treatment method, particularly, if the concentration of $SO_X$ is much higher than the concentration of $NH_3$ at the inlet of the gas absorption apparatus, the pH of the absorption liquid is lowered, and hence the desulfurization rate in the absorption apparatus cannot be increased. Thus, the $SO_X$ concentration at the inlet of the gas absorption apparatus cannot be increased excessively compared to the $SO_X$ concentration achieved in the entire gas treatment apparatus. Therefore, the lowering effect of the cost of equipment and the running cost at the section of the ammonia injection process is limited.

However, this problem can be solved by adding $NH_3$ into the absorption liquid which is circulated and used. Specifically, even though the desulfurization rate at the section of the ammonium injection method is extremely lowered and the $SO_X$ concentration is much higher than the concentration of $NH_3$ at the inlet of the gas absorption apparatus, the pH is adjusted to 2 or more by supplying $NH_3$ into the absorption liquid circulated and used in the gas absorption apparatus to increase a desulfurization rate in the gas absorption apparatus, with the result that a desired desulfurization rate can be achieved as an entire flue gas treatment apparatus.

Furthermore, if material other than $NH_3$ is used as alkaline substance, cation, other than $NH_4^+$ which is inevitably dissolved in the absorption liquid from the flue gas, makes treatment for the withdrawn absorption liquid complex. In contrast thereto, according to the flue gas treatment method of the present invention, after $SO_3^{2-}$ is oxidized to $SO_4^{2-}$ in the absorption liquid, water content in the withdrawn liquid is evaporated, whereby ammonium compounds containing ammonium sulfate can be obtained and utilized as a fertilizer together with a powder obtained in the section of the ammonia injecting method.

According to one aspect of the present invention, supply of ammonia into the absorption liquid is performed by diffusion of ammonia gas into the absorption liquid.

While it is possible to supply $NH_3$ into the absorption liquid in the form of aqueous ammonia, $NH_3$ is normally supplied in the form of ammonia gas into an ammonia injection apparatus in the ammonia injection process. Therefore, if $NH_3$ is supplied into the absorption liquid by diffusion of ammonia gas into the absorption liquid, an ammonia gas supply apparatus can be advantageously shared. The diffusion of ammonia gas into the absorption liquid may be performed by using a diffusion pipe composed of porous material and having many fine pores to dissolve ammonia gas efficiently into an object liquid for adjusting a pH. This porous pipe may be made of ceramic materials, specifically alumina porcelain. The diameters of the pores are preferably in the range of 10 to 50 $\mu$m.

According to one aspect of the present invention, the flue gas is brought into contact with cooling water before injecting ammonia into the flue gas, and a part of the cooling water which has contacted the flue gas is withdrawn, and then the withdrawn water is supplied as it is or after the dissolved sulfite ions in the withdrawn water are oxidized, as make-up water of the absorption liquid. Specifically, before injecting $NH_3$ into the flue gas containing $SO_X$, the flue gas is brought into contact with the cooling water while ammonium compounds produced by a reaction of $SO_X$ with $NH_3$ are recovered, and then the flue gas is brought into contact with the absorption liquid whose make-up water is a part of the above cooling water to remove $NH_3$ contained in the flue gas.

By bringing the flue gas containing $SO_X$ into contact with the cooling water, a part of $SO_X$ in the flue gas is dissolved as $SO_3^{2-}$ or $SO_4^{2-}$ in the cooling water, and hence the pH of the cooling water is lowered to less than 7. On the other hand, when the flue gas which has been discharged from the section of the ammonia injection process is brought into contact with the absorption liquid to absorb unreacted $NH_3$, the $NH_4^+$ concentration in the absorption liquid is gradually increased, and thus the pH of the absorption liquid is increased. If the cooling water which has contacted the flue gas is used as the make-up water whose amount corresponds to the amount of the withdrawn water plus the amount of the evaporated water being supplied to the absorption liquid, an increase of the pH of the absorption liquid can be suppressed. As described above, when the pH of absorption liquid is increased, absorption efficiency of $NH_3$ by the absorption liquid is lowered. Thus, when the cooling water which has contacted the flue gas is used as make-up water, a lowering of the absorption efficiency of $NH_3$ in the flue gas by the absorption liquid can be suppressed.

According to one aspect of the present invention, before injecting the ammonia into the flue gas, the flue gas is brought into contact with a heat exchange surface which is cooled to a temperature of not more than water saturation temperature in the flue gas, and then the condensed water generated on the heat exchange surface is withdrawn partially or entirely, and the withdrawn water is supplied as make-up water of the absorption liquid as it is or after the dissolved sulfite ions in the withdrawn water are oxidized. Specifically, before injecting $NH_3$ containing $SO_X$ into the flue gas, the flue gas is brought into contact with the heat exchange surface which is cooled to a temperature of not more than water saturation temperature in the flue gas, while ammonium compounds produced by a reaction of $SO_X$ with $NH_3$ are recovered, and then the flue gas is brought into contact with the absorption liquid whose make-up water is a part of or whole of the condensed water to remove $NH_3$ contained in the flue gas.

When the flue gas containing $SO_X$ is brought into contact with the heat exchange surface which is cooled to a temperature of not more than water saturation temperature in the flue gas, a part of water content contained in the flue gas is condensed and a part of $SO_X$ in the flue gas is dissolved as $SO_3^{2-}$ or $SO_4^{2-}$ in the condensed water, and hence the pH of the condensed water is lowered to less than 7. Therefore, if the condensed water is used as make-up water of the absorption liquid, an increase of the pH of the absorption liquid is suppressed, and a lowering of the absorption efficiency of $NH_3$ in the flue gas by the absorption liquid can be prevented.

As described above, the effect of lowering the pH in the case where $SO_X$ is dissolved in the absorption liquid in the form of $SO_4^{2-}$ is greater than that in the case where $SO_X$ is dissolved in the form of $SO_3^{2-}$, and hence the effect of suppression of lowering the absorption efficiency of $NH_3$ when $SO_4^{2-}$ is dissolved is also large. Therefore, $SO_3^{2-}$ in the cooling water or the condensed water is oxidized to $SO_4^{2-}$ by a means such as aeration, and this cooling water is used for make-up water to thus increase the effect of suppression of lowering the absorption efficiency of $NH_3$ remarkably.

In the meantime, when flue gas is cooled by bringing the flue gas into contact with cooling water circulated and used before injecting $NH_3$ into the flue gas at the section of the ammonia injection process, a pH of the recirculating cooling water is extremely lowered or SS concentration of the recirculating cooling water is extremely increased to cause a gas cooling apparatus not to be operated stably. In order to prevent this problem, a part of the recirculating cooling water is required to be withdrawn, and if the withdrawn recirculating cooling water is not supplied to a gas absorption tower as make-up water, such water is necessary to be discharged after separate treatment. In the case where flue gas is brought into contact with the heat exchange surface which is cooled to a temperature of not more than water saturation temperature in the flue gas before injecting $NH_3$ into the flue gas, as described above, the condensed water generated on the heat exchange surface is required to be discharged after separate treatment, if the condensed water is not supplied to the gas absorption tower as make-up water. In this case, because a pH of the withdrawn water and the condensed water is normally very low, adjustment of the pH using alkaline substance is an indispensable process.

According to the present invention, the withdrawn water or the condensed water is supplied to a gas absorption apparatus as make-up water and the pH is adjusted by $NH_3$ absorbed in the flue gas in the gas absorption apparatus and injecting alkaline substance such as $NH_3$, and thus it is not necessary to provide an additional pH adjusting apparatus as mentioned above. Therefore, this is effective in reducing the cost of equipment. Especially, if alkaline substance other than $NH_3$ is not supplied to the absorption liquid, and ammonium compounds containing ammonium sulfate are obtained from the withdrawn water of the absorption liquid as mention above, $SO_3^{2-}$ and/or $SO_4^{2-}$ contained in the withdrawn water or the condensed water is also contained in a part of the ammonium compounds to thus be utilized as a part of a fertilizer. This is preferable from a viewpoint of effective utilization of resources.

According to one aspect of the present invention, a part of the absorption liquid is withdrawn, and the withdrawn water is sprayed into the flue gas before, or simultaneously with, or after injection of ammonia; or after mixing the withdrawn water with ammonia. In this method, the whole of or a part of water content in the sprayed withdrawn liquid is consumed by a desulfurizing reaction and is evaporated by the heat of reaction and the sensible heat possessed originally by the flue gas. As a result, the whole of or a part of dissolved components in the withdrawn liquid is evaporated, dried and solidified, and recovered together with a powder produced by a reaction of $SO_X$ in the flue gas with the injected $NH_3$ by a product recovering apparatus such as an electrostatic precipitator. If the temperature of the flue gas before injection of ammonium, the amount of the withdrawn absorption liquid, and the amount of the sprayed absorption liquid are properly controlled, then the whole of the withdrawn liquid can be evaporated, dried and solidified. When a part of the withdrawn liquid is sprayed or a part of the sprayed withdrawn liquid is not evaporated and becomes waste water, a heat source such as steam is supplied to the remaining withdrawn liquid from the outside to evaporate water content, thereby recovering a powder or solid of ammonium compounds containing ammonium sulfate. In this case, the cost of the equipment and the running cost can be lower compared to treatment of the whole amount of the withdrawn water.

As a method for spraying the withdrawn water, a withdrawn water spray apparatus may be provided besides an ammonia injection apparatus for injecting $NH_3$ into the flue gas, and the withdrawn water spray apparatus may be arranged upstream of, or at the same position as, or downstream of the ammonia injection apparatus. In order to improve the desulfurization rate at the section of the ammonia injection process at the upstream side, it is preferable to mix $NH_3$ with the withdrawn liquid, and spray and inject an ammonia dissolved liquid in the form of drop lets. According to this method, a desulfurization reaction is extremely accelerated in the gas-liquid interfaces between droplets of the ammonia dissolved liquid and gas.

According to one aspect of the present invention, the flue gas is irradiated with electron beam after the ammonia is injected and before the ammonium compounds are recovered.

In the flue gas treatment method of the present invention, in the case where the flue gas treatment capability (desulfurization rate and concentration of leak ammonia) at the section of the electron beam process at an upstream side except a gas absorption apparatus is the same as that of the electron beam process only, the flue gas treatment capability of the entire flue gas system including the gas absorption apparatus can be improved further than that of the electron beam process only. When the flue gas treatment capability of the entire flue gas treatment apparatus is the same as that of the electron beam process only, the dose of electron beam required for achieving a desired desulfurization rate can be suppressed remarkably. Thus, the running cost and the cost of equipment in the section of the electron beam process can be significantly reduced.

According to one aspect of the present invention, the electron beam is applied to the flue gas through a metal foil, and the metal foil is cooled with air, and then the air after cooling is injected into the flue gas before the flue gas contacts the absorption liquid.

An electron beam generating apparatus comprises a direct current high voltage power supply for generating direct current high voltage ranging from hundreds kV to several MV, a supply path such as a high-voltage cable for supplying such direct current, and an electron accelerator for accelerating and emitting electrons by the direct current high voltage. The interior of the electron accelerator is kept under vacuum, and a vacuum space is partitioned from the atmosphere by a thin metal foil (hereinafter referred to as window foil). The accelerated electrons pass through the window foil of the electron accelerator side, or in some cases, through this window foil and another window foil for isolating the flue gas from the atmosphere (hereinafter referred to as window foil of the process vessel side) into the flue gas. In this case, because a part of energy of accelerated electrons is lost by the thin metal foil to convert such energy to heat, cooling air is blown on the metal window foil to prevent the temperature of the metal window foil from being raised to a temperature exceeding an allowable temperature (350° C. or less). At this time, since air is also irradiated with electron beam, ozone is generated in the cooling air too. In this manner, ozone-containing air thus generated is injected between a product recovering apparatus and a gas absorption apparatus to convert remaining NO to $NO_2$ or $N_2O_5$. As a result, as described later, the converted $NO_2$ or $N_2O_5$ is absorbed in the absorption liquid according to a pH of the absorption liquid in the gas absorption apparatus.

According to one aspect of the present invention, ozone-containing gas is injected into the flue gas before the flue gas contacts the absorption liquid.

In the case where flue gas such as boiler combustion flue gas contains not only $SO_X$ but $NO_X$ (mostly NO), and is irradiated with electron beam at the upstream side of the gas absorption apparatus in addition to injection of $NH_3$, besides $SO_X$, $NO_X$ is converted to a powder whose main component is ammonium nitrate, and recovered and removed in the product recovering apparatus. However, when the dose of electron beam is small, the rate of removing $NO_X$ becomes small, and NO of a part of $NO_X$, and $NO_2$ or $N_2O_5$ of the rest of $NO_X$ enter the gas absorption apparatus. When irradiation of electron beam is not performed at the upstream side of the gas absorption apparatus, a part of $NO_2$ and $N_2O_5$ contained originally in the boiler flue gas is converted to a powder whose main component is ammonium nitrate, and the rest of $N_2$ and $N_2O_5$, and most of NO contained in the flue gas enter the gas absorption apparatus without causing reaction. In the gas absorption apparatus, $NO_2$ or $N_2O_5$ is absorbed in the absorption liquid according to the pH of the absorption liquid and is converted to nitrite ions ($NO_2^-$) or nitrate ions ($NO_3^-$), but NO is not mostly absorbed.

Thus, in the case where the dose of electron beam is reduced, or irradiation of electron beam is not performed at all, in order to achieve a high $NO_X$ removal rate (hereinafter referred to as denitration rate) in the entire flue gas treatment apparatus, NO is needed to be converted to $NO_2$ or $N_2O_5$ at the inlet of the gas absorption apparatus as much as possible. As a method for converting NO to $NO_2$ or $N_2O_5$ besides the electron beam irradiation method, there is a corona discharge method. Therefore, it is desirable to employ an electrostatic precipitator utilizing corona discharge as a product collecting apparatus in the section of the electron beam process at the upstream side.

Further, NO may be converted to $NO_2$ or $N_2O_5$ by injecting ozone into the flue gas. While ozone may be injected anywhere as far as such injection is performed at the upstream side of the gas absorption apparatus, ozone is preferably injected at the place where $NH_3$ concentration is the smallest in the section of the ammonia injection process at the upstream side, i.e. the place between the product recovering apparatus and the gas absorption apparatus, because ozone reacts with $NH_3$ to produce $NO_X$ and to allow itself decomposed. The thus produced $NO_2$ or $N_2O_5$, if irradiation of electron beam is performed at the upstream side of the gas absorption apparatus, is absorbed together with $NO_2$ or $N_2O_5$ produced by irradiation of electron beam in the absorption liquid, thus becoming nitrite ions ($NO_2^-$) and/or nitrate ions ($NO_3^-$). In this case, if the gas absorption apparatus has a mechanism for oxidizing $SO_3^{2-}$ to $SO_4^{2-}$, this $NO_2^-$ is also oxidized to $NO_3^-$.

According to the present invention, there is provided a flue gas treatment apparatus for removing sulfur oxides in flue gas using ammonia, comprising: an ammonia injection apparatus for injecting ammonia into flue gas containing sulfur oxides, a process vessel for allowing injected ammonia to react with sulfur oxides; a recovering apparatus for recovering produced ammonium compounds containing ammonium sulfate; and a gas absorption apparatus for bringing the flue gas after recovery into contact with an absorption liquid.

According to one aspect of the present invention, the gas absorption apparatus comprises a mechanism for recirculating the absorption liquid, and a mechanism for oxidizing sulfite ions in the absorption liquid.

According to one aspect of the present invention, the gas absorption apparatus comprises a means for adjusting a pH of the absorption liquid by injecting ammonia into the absorption liquid.

According to one aspect of the present invention, the pH adjusting means comprises a supply port for supplying aqueous solution before adjusting a pH of the aqueous solution; a discharge port for discharging the aqueous solution after adjusting a pH of the aqueous solution; a pH adjusting tank having an ammonia diffusing means for diffusing ammonia gas into the aqueous solution held in the tank; a pH measuring device for measuring a pH of the aqueous solution held in the pH adjusting tank; and an ammonia gas supply line having an adjusting valve for supplying ammonia gas to the ammonia diffusing means.

According to one aspect of the present invention, the ammonia injection means comprises a diffusing pipe made of porous material for diffusing the ammonia gas into the absorption liquid.

According to one aspect of the present invention, the flue gas treatment apparatus comprises a gas cooling apparatus for bringing the flue gas containing sulfur oxides into contact with cooling water before injecting ammonia; a means provided in the gas cooling apparatus for circulating and using the cooling water; and a line for withdrawing a part of the cooling water; wherein the line for withdrawing a part of the cooling water is connected to a line for introducing make-up water of the gas absorption apparatus.

According to one aspect of the present invention, the flue gas treatment apparatus comprises a heat exchanger having a heat exchange surface cooled to a temperature of not more than water saturation temperature in the flue gas containing sulfur oxides before injecting ammonia; and a line for withdrawing condensed water generated on a gas-contact surface of the heat exchanger, wherein the line for withdrawing the condensed water is connected to a line for introducing make-up water of the gas absorption apparatus.

According to one aspect of the present invention, the gas absorption apparatus has a line for withdrawing the absorption liquid, and a withdrawn liquid spray apparatus for spraying and injecting the withdrawn absorption liquid is provided upstream of, or at the same position as, or downstream of the ammonia injection apparatus.

According to one aspect of the present invention, the process vessel has a window for allowing electron beam to pass therethrough and irradiating the flue gas therein with electron beam.

BRIEF DESCRIPTION OF DRAWING

FIG. 5 is a flow diagram showing an example for performing a flue gas treatment method according to a second aspect of the present invention;

BEST MODE FOR CARRYING OUT THE INVENTION

Figure 1:
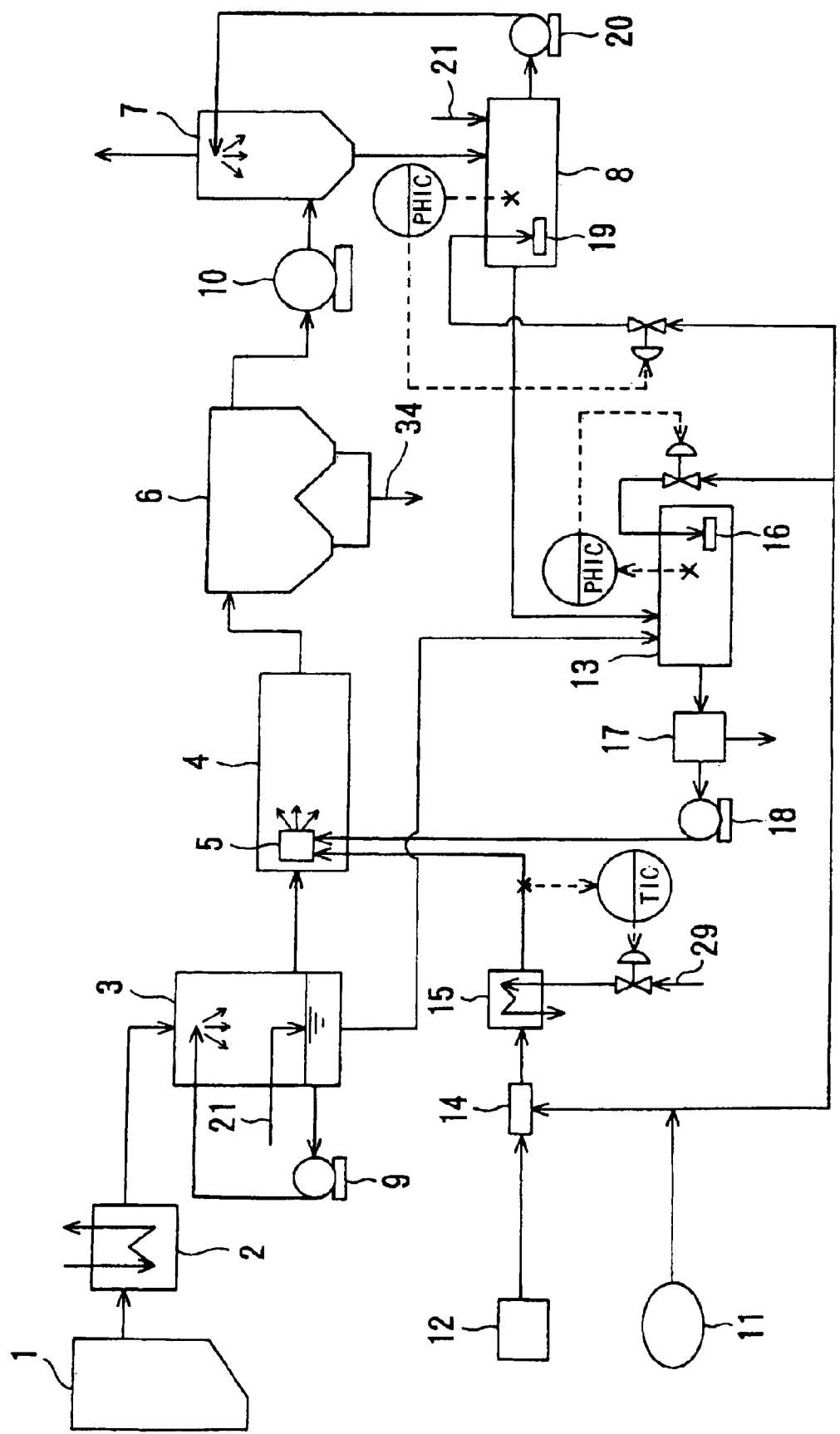
FIG. 1 is a flow diagram showing an example of a flue gas treatment apparatus according to a first aspect of the present invention.

According to a first aspect of the present invention, there is provided a treatment method for desulfurizing flue gas in which $NH_3$ or a mixture of $NH_3$ and water is injected into flue gas containing $SO_X$ to react $SO_X$ with $NH_3$, thus producing a powder of ammonium compounds containing ammonium sulfate, and after recovering the powder, the flue gas is brought into contact with an absorption liquid in which $SO_4^{2-}$ and/or $SO_3^{2-}$ and/or $NH_4^+$ are dissolved, thus absorbing remaining $SO_X$ and/or $NH_3$ contained in the flue gas by the absorption liquid and removing the remaining $SO_X$ and/or $NH_3$.

In the flue gas treatment method of the present invention, the residual $SO_X$, contained in the flue gas, which has not reacted with the injected $NH_3$ and has not been converted into a powder of ammonium compounds, is brought into contact with an absorption liquid in which the above $SO_4^{2-}$ and/or $SO_3^{2-}$ and/or $NH_4^+$ is dissolved, and absorbed in the absorption liquid and removed.

In the conventional technology, in the case where 90% or more of a final desulfurization rate is required, $NH_3$ is injected and a relatively large dose of electron beam is required, or aqueous ammonia is required to be pulverized into droplets having an extremely small Sauter mean diameter and to be sprayed. However, according to the present invention, the desulfurization rate in the section of the ammonia injection process at the upstream side of a contact position where the flue gas contacts the absorption liquid can be lowered to 90% or less by spraying aqueous ammonia in the form of droplets having a certain Sauter mean diameter achieved without requiring a large amount of energy to generate a large amount of compressed air and the like, and without electron beam.

Further, when the flue gas is brought into contact with the absorption liquid in which $SO_4^{2-}$ and/or $SO_3^{2-}$ and/or $NH_4^+$ is dissolved, not only the remaining $SO_X$ but the remaining $NH_3$ which has not reacted with $SO_X$ in the flue gas and has not been converted to a powder of ammonium compounds is absorbed into the absorption liquid and removed.

Therefore, even if final leakage of $NH_3$ is required to be about 10 ppm or less, the leakage of $NH_3$ from the section of the ammonia injection process at the upstream side of the contact position with the absorption liquid may be about 10 ppm or less, and the Sauter mean diameter of droplets of splayed aqueous ammonia may be further enlarged.

On the other hand, as a method for removing $SO_X$ from the flue gas, there is a method for removing $SO_X$ in the flue gas by bringing the flue gas containing $SO_X$ into contact with an absorption liquid in which $SO_4^{2-}$ and/or $SO_3^{2-}$ and/or $NH_4^+$ is dissolved (hereinafter referred to as wet ammonia method). In the wet ammonia method, in order to increase a desulfurization rate, several measures are taken as follows: A large amount of absorption liquid is circulated and sprayed for raising contact efficiency between the flue gas and the absorption liquid; the retention time in the contacting area where the flue gas contacts the absorption liquid is prolonged; and a pH of the absorption liquid is increased by increasing the $NH_4^+$ concentration in the absorption liquid.

However, there are problems in these measures, and in the first measure the required power of a recirculation pump for the absorption liquid becomes large to increase the running cost, in the second measure a capacity of the vessel in which the flue gas contacts the absorption liquid becomes large to increase the construction cost, and in the third measure $NH_3$ is diffused from the absorption liquid to increase leakage of $NH_3$.

However, according to the present invention, because most of $SO_X$ in the flue gas is removed at the section of the ammonia injection process at the upstream side of the contact position with the absorption liquid, the desulfurization rate achieved by contact with the absorption liquid may be small.

For example, if a final desulfurization rate is 94% and 85% of $SO_X$ is removed at the section of the ammonia injection process, then a desulfurization rate achieved by contact with the absorption liquid is 60% by the following formula (5), and hence the above problems do not arise.

$$(1-(100-94)/(100-85))\times 100=60(\%) \text{tm (5)}$$

According to the flue gas desulfurizing method of the present invention, in the flue gas discharged from the section of the ammonia injection process at the upstream side, the remaining $SO_X$ and $NH_3$ which have not been converted to a powder of ammonium compounds, and the remaining powder which has not been recovered by a powder recovering apparatus are contained, and a part of such remaining things is absorbed and trapped in the absorption liquid. On the other hand, when the absorption liquid contacts the flue gas discharged from the section of the ammonia injection process, a part of the absorption liquid is scattered into the flue gas and a part of water content in the absorption liquid is evaporated. Therefore, the concentration of $SO_4^{2-}$ and/or $SO_3^{2-}$ and/or $NH_4^+$ is gradually increased. In order to keep component and concentration of the absorption liquid within a certain range, it is desirable that the absorption liquid is partially withdrawn and water is replenished according to the amount of the withdrawn absorption liquid, and the amount of the evaporated or scattered absorption liquid when the absorption liquid contacts the flue gas.

According to the flue gas treatment process of the present invention, because the desulfurization rate achieved by the contact with the absorption liquid can be relatively small as described above and the pH of the absorption liquid can be lower compared to the wet ammonia method only, the leakage of $NH_3$ after contact with the absorption liquid can be lowered.

In the present invention, the pH of the absorption liquid is preferably adjusted in the range of 2 to 8 according to the desulfurization rate which should be achieved by contact with the absorption liquid (60% in the above example).

The pH of the absorption liquid is varied with the amount of $SO_X$, $NH_3$ and a powder absorbed and trapped in the absorption liquid, and the amount of the withdrawn water, and the amount of make-up water. Particularly, if the amount of $NH_3$ injected at the section of the ammonia injection process at the upstream side is varied, the desulfurization rate and leakage of $NH_3$ at the section of the ammonia injection process are varied to change the amount of $SO_X$ and $NH_3$ absorbed in the absorption liquid. Thus, the pH of the absorption liquid can be adjusted by adjusting the amount of $NH_3$ injected at the section of the ammonia injection process. Further, because the amount of the withdrawn water is varied to cause the concentration of several ions in the absorption liquid to be changed, the pH of the absorption liquid can be adjusted in the range of 2 to 8 by adjusting the amount of the withdrawn water.

Further, the pH of the absorption liquid is also varied by injecting sulfuric acid and/or ammonia into the absorption liquid. Thus, the pH of the absorption liquid can be adjusted in the range of 2 to 8 by adjusting the amount of sulfuric acid to be injected and/or the amount of ammonia to be injected. In order to use additional chemicals other than $NH_3$ used in the section of the ammonia injection process, it is desirable that the amount of $NH_3$ injected into the flue gas is adjusted so that the pH of the absorption liquid is adjusted to 8 or less, preferably 7 or less without adding acid substance to the absorption liquid, and then the pH of the absorption liquid is adjusted in the range of 2 to 8 by supplying $NH_3$ into the absorption liquid.

Since $SO_4^{2-}$ and/or $SO_3^{2-}$ and/or $NH_4^+$ is contained in the withdrawn absorption liquid (hereinafter referred to as withdrawn liquid), if necessary, sulfuric acid and/or $NH_3$ is injected, and, if further necessary, $SO_3^{2-}$ is oxidized to $SO_4^{2-}$ and water content is evaporated, whereby a powder or solid of ammonium compounds containing ammonium sulfate which is the same as a powder recovered at the section of the ammonia injection process can be obtained, and can be utilized as a fertilizer.

However, in order to obtain a powder or solid of ammonium compounds containing ammonium sulfate from the withdrawn liquid in this manner, facilities and energy such as heat and electric power are necessary to evaporate water content. According to the flue gas treatment method of the present invention, the withdrawn liquid is sprayed as it is or after diluting the withdrawn liquid with water at the section of the ammonia injection process before, or simultaneously with, or after injection of $NH_3$; after mixing the withdrawn liquid with $NH_3$; or at the time between injection of $NH_3$ and recovery of the powder.

In this method, the whole of or a part of water content in the sprayed withdrawn liquid is consumed by a desulfurizing reaction represented by the above formula (1) and is evaporated by the heat of reaction and the sensible heat possessed originally by the flue gas. As a result, the whole of or a part of dissolved components in the withdrawn liquid is evaporated, dried and solidified, and recovered together with a powder produced by a reaction of $SO_X$ in the flue gas with the injected $NH_3$ by a product recovering apparatus such as an electrostatic precipitator. If the temperature of the flue gas before injection of $NH_3$, the amount of the withdrawn absorption liquid, and the amount of the sprayed absorption liquid are properly controlled, then the whole of the withdrawn liquid can be evaporated, dried and solidified. When a part of the withdrawn liquid is sprayed or a part of the sprayed withdrawn liquid is not evaporated and becomes waste water, the above treatment is applied to the remaining withdrawn liquid, thereby recovering a powder or solid of ammonium compounds containing ammonium sulfate. In this case, the cost of the equipment and the running cost can be lower compared to treatment of the whole amount of the withdrawn water.

As a method for spraying the withdrawn water, a withdrawn water spray apparatus may be provided besides an ammonia injection apparatus for injecting $NH_3$ into the flue gas, and the withdrawn water spray apparatus may be arranged upstream of, or at the same position as, or downstream of the ammonia injection apparatus. In order to improve a desulfurization rate in the section of the ammonia injection process, it is preferable to mix $NH_3$ with the withdrawn liquid, and spray and inject an ammonia dissolved liquid in the form of droplets. According to this method, a desulfurization reaction as in the above formula (1) is extremely to accelerated in the gas-liquid interfaces between droplets of the ammonia dissolved liquid and gas.

Further, flue gas is cooled in the range of water saturation temperature to 80° C. before droplets of the ammonia dissolved liquid are sprayed and injected, and the ammonia dissolved liquid is pulverized into droplets having a Sauter mean diameter of 0.5 $\mu$m to 30 $\mu$m and sprayed, whereby a high desulfurization rate can be improved in the section of the ammonia injection process.

As a method for mixing $NH_3$ and the withdrawn liquid, there may be a method in which the withdrawn liquid or a mixed liquid of the withdrawn liquid and water is mixed with $NH_3$ in advance to produce an ammonia dissolved liquid, and the ammonia dissolved liquid is sprayed and injected. At this time, if the ammonia dissolved liquid and compressed air are mixed and sprayed in a gas-liquid mixture with a two-fluid nozzle, it is possible to pulverize the ammonia dissolved liquid and spray the ammonia dissolved liquid.

As a method for mixing $NH_3$ and the withdrawn water, there may be another method in which the withdrawn water or a mixed liquid of the withdrawn water and water, and $NH_3$ gas or a mixed gas of $NH_3$ gas and air are mixed and sprayed in a gas-liquid mixture with a two-fluid nozzle.

According to the above method, an additional mixer for mixing the withdrawn liquid or the mixed liquid of the withdrawn liquid and water with $NH_3$ is not necessary to save the cost of equipment. In the case where $NH_3$ is mixed with air, particularly, the pressure at the time of mixing is high, $NH_3$ reacts with carbon dioxide in air to produce ammonium carbonate or the like, and in some cases, a piping in which the mixed gas flows may be clogged. For preventing this clogging, it is desirable that the piping for the mixed gas is heated by a steam tracing or the like, or $NH_3$ and/or air and/or the mixed gas is heated. In a gas-liquid mixing room of the two-fluid nozzle, when the withdrawn liquid or the mixed liquid of the withdrawn liquid and water, and $NH_3$ gas or the mixed gas of $NH_3$ and air are mixed to form a gas-liquid mixture, if calcium ions and/or magnesium ions are dissolved in the liquid, these ions are deposited on a liquid-contact surface of the gas-liquid mixing room to cause scale. Thus, it is desirable to remove calcium ions and/or magnesium ions from the withdrawn liquid or the mixed liquid of the withdrawn liquid and water in advance.

Next, a first aspect of the present invention will be described in detail with reference to FIGS. 1 through 4.

FIG. 1 is a flow diagram showing an example of a flue gas treatment apparatus according to the first aspect of the present invention. In FIG. 1, the reference numeral 1 represents a boiler, the reference numeral 2 a heat exchanger, the reference numeral 3 a gas cooling tower, the reference numeral 4 a process vessel, the reference numeral 5 a two-fluid nozzle, the reference numeral 6 an electrostatic precipitator, the reference numeral 7 a gas absorption tower, the reference numeral 8 an absorption liquid storage tank, the reference numeral 9 a cooling water recirculating pump, the reference numeral 10 a flue gas pressurizing fan, the reference numeral 11 an ammonia storage tank, the reference numeral 12 a compressor, the reference numeral 13 a spray water storage tank, the reference numeral 14 a line mixer, the reference numeral 15 a mixed gas heater, the reference numerals 16, 19 ammonia diffusion pipes, the reference numeral 17 a filter, the reference numeral 18 a spray pump, and the reference numeral 20 an absorption liquid recirculating pump.

Flue gas containing $SO_X$ discharged from the boiler 1 passes through the heat exchanger 2, and recirculating cooling water is circulated by the pump 9, and the flue gas enters the gas cooling tower 3 to which industrial water 21 is supplied as necessary. In the gas cooling tower 3, the flue gas is cooled, and then introduced into the process vessel 4.

In the process vessel 4, a mixed gas of $NH_3$ gas and compressed air, and an ammonia dissolved liquid are sprayed from the two-fluid nozzle 5 to cause $SO_X$ in the flue gas to react with $NH_3$, and then the flue gas is sent to the electrostatic precipitator 6.

The compressed air from the compressor 12 and $NH_3$ gas from the ammonia storage tank 11 are mixed with each other in the line mixer 14, and the mixed gas is heated by indirect heat exchange with steam 29 in the mixed gas heater 15, and then supplied to the two-fluid nozzle 5. Further, the absorption liquid from the absorption liquid storage tank 8, and recirculating cooling water from the gas cooling tower 3 are received by the spray water storage tank 13, and $NH_3$ gas is introduced from the ammonia diffusion pipe 16 into the spray water storage tank 13, and then the produced ammonia dissolved liquid is supplied to the two-fluid nozzle 5 through the filter 17 by the spray pump 1B. The introduction of $NH_3$ gas from the ammonia diffusion pipe 16 is for the sake of adjusting a pH of the spray water, and most of $NH_3$ is supplied from the ammonia storage tank 11 through the line mixer 14 together with compressed air to the two-fluid nozzle 5.

A fine powder such as ammonium sulfate obtained by a reaction is removed in the electrostatic precipitator 6, and the flue gas is introduced into the gas absorption tower 7 through the flue gas pressurizing fan 10. In the gas absorption tower 7, the remaining acid substance such as $SO_X$ is removed by spraying the absorption liquid containing $NH_3$, and then the flue gas is discharged from the gas absorption tower 7 to the atmosphere.

The absorption liquid containing $NH_3$ is obtained by diffusing $NH_3$ gas from the ammonia diffusion pipe 19 into the introduced industrial water 21 in the absorption liquid storage tank 8, and the obtained absorption liquid is sprayed into the gas absorption tower 7 while being circulated by the absorption liquid recirculating pump 20. Although the absorption tower in which the absorption liquid containing $NH_3$ has been described, when the amount of remaining $NH_3$ is large, acids such as sulfuric acid may be introduced into the absorption liquid.

Figure 2:
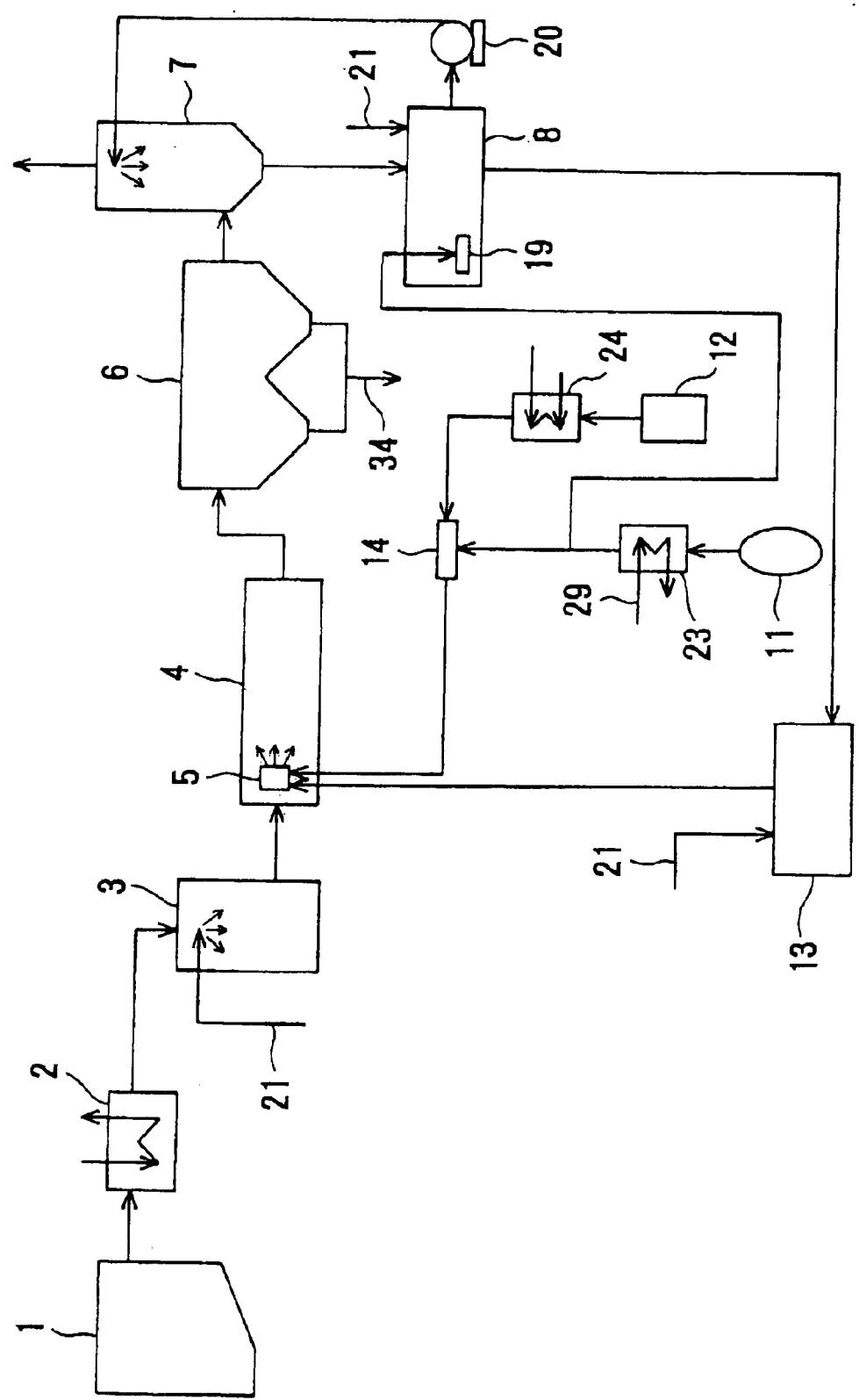
FIG. 2 is a flow diagram showing another example of a flue gas treatment apparatus according to the first aspect of the present invention.

FIG. 2 is a flow diagram showing another example of a flue gas treatment apparatus according to the first aspect of the present invention.

In FIG. 2, the same reference numerals as those in FIG. 1 have the same meaning, and the reference numeral 23 represents an ammonia carburetor and the reference numeral 24 represents an after-cooler.

Flue gas containing $SO_X$ and generated in the boiler 1 is cooled in the heat-exchanger 2, and then introduced into the gas cooling tower 3. In the gas cooling tower 3, the flue gas is brought into contact with industrial water 21 sprayed from the top of the gas cooling tower 3 and is cooled, and then led to the process vessel 4.

On the other hand, liquefied ammonia supplied from the ammonia storage tank 11 becomes $NH_3$ gas by indirect heat exchange with steam in the ammonia carburetor 23, and this $NH_3$ gas is supplied to the line mixer 14. Further, compressed air generated in the compressor 12 is cooled by indirect heat exchange with cooling water in the after-cooler 24, and then supplied to the line mixer 14. In the line mixer 14, the compressed air is mixed with $NH_3$ gas.

An ammonia mixed air is supplied to the two-fluid nozzle 5 disposed at the inlet portion of the process vessel 4, and is mixed in the two-fluid nozzle 5 with spray water produced by mixing the absorption liquid supplied from the absorption liquid storage tank 8 through the spray water storage tank 13 with the industrial water 21 in the spray water storage tank 13, and then the mixture produced in the two-fluid nozzle 5 is sprayed and injected into the flue gas. $SO_X$ in the flue gas is converted to a powder whose main component is ammonium sulfate. The powder is collected by the electrostatic precipitator 6, and the flue gas is introduced into the gas absorption tower 7. In the gas absorption tower 7, the remaining acid substance such as $SO_X$ is removed by spraying the absorption liquid containing $NH_3$, and then the flue gas is discharged from the gas absorption tower 7 to the atmosphere.

The absorption liquid containing $NH_3$ is obtained by diffusing $NH_3$ gas supplied from the ammonia diffusion pipe 19 through the ammonia carburetor 23 into the introduced industrial water 21 in the absorption liquid storage tank 8, and the obtained absorption liquid is sprayed into the gas absorption tower 7 while being circulated by the absorption liquid recirculating pump 20.

Figure 3:
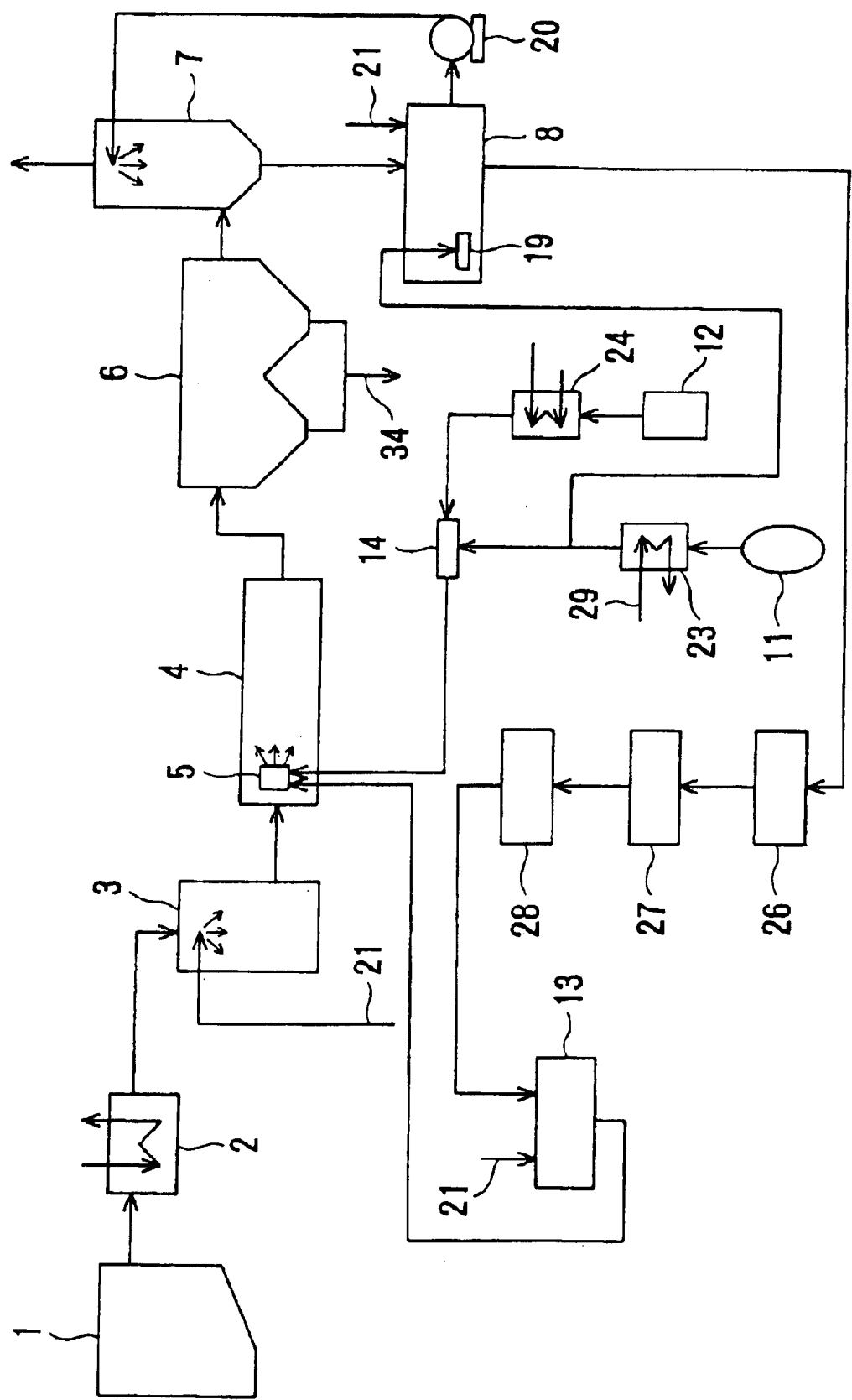
FIG. 3 is a flow diagram showing still another example of a flue gas treatment apparatus according to the first aspect of the present invention.

FIG. 3 is a flow diagram showing another example of a flue gas treatment apparatus according to the first aspect of the present invention. The apparatus shown in FIG. 3 is different from the apparatus shown in FIG. 2 in that while the absorption liquid from the absorption liquid storage tank 8 is mixed with the industrial water 21 in the spray water storage tank 13, and then supplied to the two-fluid nozzle 5 in FIG. 2, the absorption liquid from the absorption liquid storage tank 8 is supplied to the spray water storage tank 13 through a coagulation sedimentation tank 26, a sand filtration tank 27 and a cation exchange resin tank 28, and mixed with industrial water 21 in the spray water storage tank 13, and then supplied the two-fluid nozzle 5 in FIG. 3.

Specifically, in FIG. 3, the withdrawn water withdrawn from the absorption liquid storage tank 8 is led to the coagulation sedimentation tank 26 in which polymeric flocculant is injected into the withdrawn water. Thus, suspended solid in the withdrawn water is coagulated and precipitated in the coagulation sedimentation tank 26, and the suspended solid is discharged as slurry to the outside of the system. A supernatant liquid of the withdrawn water is led to the sand filtration tank 27 in which the remaining suspended solid is removed, and then led to the cation exchange resin tank 28.

In the cation exchange resin tank 28, calcium ions and magnesium ions dissolved in the withdrawn water which has been filtrated are exchanged for sodium ions on the resin, and thus are removed. The withdrawn water which has been changed into soft water is supplied to the two-fluid nozzle 5 disposed at the inlet of the process vessel 4.

The withdrawn water supplied to the two-fluid nozzle 5 is treated in the withdrawn water treatment apparatus ranging from the absorption liquid storage tank 8 to the cation exchange resin tank 28 such that the withdrawn water has a pH of 5 to 9 and the concentration of suspended solid in the withdrawn water is equal to or less than 10 mg/L (liter), and then the withdrawn water is sprayed together with a mixed gas of $NH_3$ gas and compressed air produced in the line mixer 14 from the two-fluid nozzle 5 into the process vessel 4.

Figure 4:
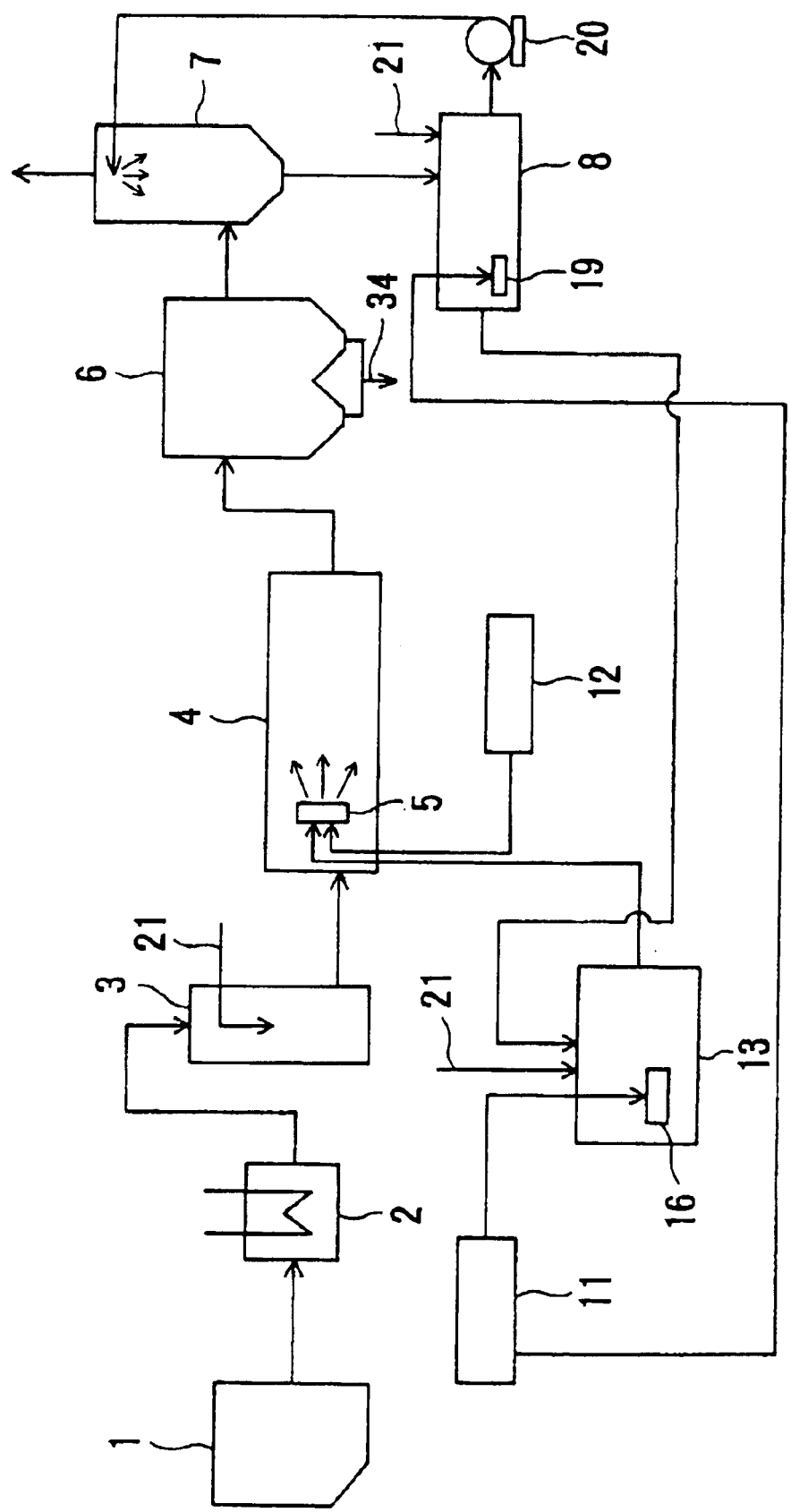
FIG. 4 is a flow diagram showing still another example of a flue gas treatment apparatus according to the first aspect of the present invention.

FIG. 4 is a flow diagram showing another example of a flue gas treatment apparatus according to the first aspect of the present invention.

In FIG. 4, the same reference numerals as those in FIG. 1 have the same meaning.

Flue gas containing $SO_X$ and generated in the boiler 1 is cooled in the heat-exchanger 2, and then introduced into the gas cooling tower 3. In the gas cooling tower 3, the flue gas is brought into contact with industrial water 21 sprayed from the top of the gas cooling tower 3 and is cooled, and then led to the process vessel 4. On the other hand, $NH_3$ which is supplied from the ammonia storage tank 11 through the ammonia diffusion pipe 16 and the absorption liquid supplied from the absorption liquid storage tank 8 are mixed with industrial water 21 in the spray water storage tank 13 to produce aqueous solution in which $NH_3$ is dissolved. The ammonia dissolved aqueous solution and compressed air from the compressor 12 are mixed and sprayed in a gas-liquid mixture by the two-fluid nozzle 5 disposed at the inlet of the process vessel, thereby injecting the pulverized droplets of aqueous ammonia into the flue gas. All of $NH_3$ sprayed into the process vessel is once dissolved into the mixed liquid of the absorption liquid supplied from the absorption liquid storage tank 8 and industrial water 21 in the spray water storage tank 13. Further, the resultant powdery by-product whose main component is ammonia sulfate is collected by the dry electrostatic precipitator 6. The flue gas after collection is introduced into the gas absorption tower 7 and treated in the same manner as FIG. 1.

Embodiment 1

Next, the present invention will be described with reference to the embodiment shown in FIG. 1.

Embodiment 1-1

A flue gas treatment method according to an embodiment of the present invention will be described with reference to FIG. 1. All of the concentration of $SO_X$, $NO_X$, $NH_3$ and dust in flue gas is the concentration in terms of the amount of inlet dry gas. 1500 $Nm^3/h$ of flue gas containing 50 ppm of $SO_X$ and generated by the boiler 1 is cooled to 150° C. by the heat exchanger 2, and led to the gas cooling tower 3. In the gas cooling tower 3, recirculating cooling water is sprayed by the cooling water recirculating pump 9, and the flue gas is cooled to 60° C. and 10 ppm of $SO_X$ in the flue gas is absorbed in the cooling water.

The recirculating cooling water in the gas cooling tower 3 is withdrawn into the spray water storage tank 13 at a rate of 3 L (liter)/h, and industrial water 21 is replenished according to the amount of the withdrawn water, and the amount of water evaporated or scattered when the recirculating water contacts the flue gas. Thus, water level of the recirculating cooling water at the bottom of the gas cooling tower 3 is kept constant, and the pH of the recirculating cooling water is kept at 2. The flue gas discharged from the gas cooling tower 3 is led to the process vessel 4.

On the other hand, 1.4 kg/h of $NH_3$ gas which has been supplied from the ammonia storage tank 11 is mixed in the line mixer 14 with 8 $Nm^3/h$ of compressed air which has been supplied from the compressor 12 and cooled by the after-cooler. The temperature of the ammonia mixed air is adjusted by the mixed gas heater 15, and the ammonia mixed air is supplied to the two-fluid nozzle 5, and then sprayed together with 8 L/h of the spray water supplied from the spray pump 18 in the form of two-fluid mixture. $NH_3$ in the mixed gas is dissolved partially in the spray water, and hence the spray water is sprayed into the gas as an ammonia dissolved liquid. The Sauter mean diameter of the sprayed droplets is 10 $\mu$m, and water content in the sprayed water is evaporated completely, and thus dissolved components in the sprayed water are evaporated, dried and solidified to form a powder of by-product whose main component is ammonium sulfate.

60% of $SO_X$ in the flue gas led to the process vessel 4 reacts with $NH_3$ and is converted to a powder of by-product whose main component is ammonia sulfate by the two-fluid mixing spray of the spray water and the ammonia mixed air. 5.9 kg/h of the by-product powder comprising the by-product powder produced by the reaction and a by-product powder produced by evaporating, drying and solidifying the dissolved components in the sprayed water, and the flue gas containing 340 ppm of the remaining $SO_X$ and 340 ppm of the remaining $NH_3$ are led to the electrostatic precipitator 6.

99% of a by-product powder in the flue gas is collected in the electrostatic precipitator 6, and 5.8 kg/h of the by-product powder is discharged from the bottom of the electrostatic precipitator 6. The concentration of by-product dust in the flue gas is 44 $mg/Nm^3$, and the flue gas is pressurized by the flue gas pressurizing fan 10, and then led to the gas absorption tower 7. In the gas absorption tower 7, the absorption liquid is sprayed by the absorption liquid recirculating pump 20, and 75% of $SO_X$ in the flue gas led to the gas absorption tower 7 is absorbed in the absorption liquid, and $NH_3$ and the by-product dust are absorbed and collected by the absorption liquid as well. Consequently, the flue gas containing 85 ppm of $SO_X$, 10 ppm of $NH_3$ and 30 $mg/Nm^3$ of by-product dust is discharged from the top of the gas absorption tower 7 to the atmosphere. As a result, 90% of a relatively high desulfurization rate is achieved without irradiation of electron beam and under low concentration of leak ammonia of 10 ppm.

The absorption liquid in the gas absorption tower 7 is stored temporarily in the absorption liquid storage tank 8 from which the absorption liquid is withdrawn to the spray water storage tank 13 at a rate of 5 L/h, and industrial water 21 is replenished to the absorption liquid storage tank 8 according to the amount of the withdrawn water, and the amount of water evaporated or scattered when the recirculating water contacts the flue gas. $NH_3$ is supplied to the absorption liquid storage tank 8 from the ammonia diffusion pipe 19 such that the pH of the absorption liquid in the absorption liquid storage tank 8 becomes 3. In this case, the amount of diffused ammonia is 0.1 kg/h.

3 L/h of the withdrawn liquid from the gas cooling tower 3 and 5 L/h of the withdrawn liquid from the gas absorption tower 7 are supplied to the spray water storage tank 13 as described above, and $NH_3$ gas is supplied from the ammonia diffusion pipe 16 into the spray water storage tank 13 such that the pH of the spray water is adjusted to 4. In this case, the amount of diffused $NH_3$ gas is 0.03 kg/h. 8 L/h of the spray water discharged from the spray water storage tank 13 is supplied to the filter 17 in which undissolved content is removed as sludge, and is then supplied by the spray pump 18 to the two-fluid nozzle 5. Then, the spray water is sprayed together with the ammonia mixed air in the form of two-fluid mixture as described above. 1.9 kg/h of ammonium compounds are dissolved in 8 L/h of the spray water, and are dried and solidified to produce a by-product powder by evaporating the sprayed water, and this by-product powder is collected together with a by-product powder produced in the reaction by the electrostatic precipitator 6.

According to the first aspect of the present invention, the gas absorption apparatus is provided in the subsequent stage, and hence leakage of $NH_3$ can be lowered and a high desulfurization rate can be achieved while suppressing the cost of energy.

According to a second aspect of the present invention, there is provided a treatment method for desulfurizing and/or denitrating a flue gas in which $NH_3$, or $NH_3$ and water are injected into flue gas containing $SO_X$ and $NO_X$ and the flue gas is irradiated with electron beam to react $SO_X$ and $NO_X$ with $NH_3$ for thereby producing a powder of ammonium compounds containing ammonium sulfate and ammonium nitrate, and after recovery of the powder, the flue gas is brought into contact with an absorption liquid in which $SO^{+2-}$ and/or $SO_3^{2-}$ and/or $NO_2^-$ and/or $NO_3^-$ and/or $NH_4^+$ is dissolved, thus absorbing and removing the remaining $SO_X$ and/or $NO_X$ and/or $NH_3$ contained in the flue gas by the absorption liquid.

In the flue gas treatment method of the present invention, in order to improve an absorption efficiency of $NO_X$ in a gas absorption apparatus, it is desirable that after injection of $NH_3$ and irradiation of electron beam, the remaining NO is oxidized to $NO_2$ or $N_2O_5$. For that reason, an electrostatic precipitator which utilizes corona discharge can be employed as a recovering apparatus of the powder.

Further, in order to oxidize NO remaining in the flue gas discharged from the section of the electron beam process to $NO_2$ or $N_2O_5$, ozone-containing air which has cooled the metal foil for allowing electron beam to pass therethrough may be injected into the flue gas after irradiation of electron beam and before entering the gas absorption apparatus. Further, ozone generated in an ozone generating apparatus separately provided may be injected into the flue gas.

Embodiment 2

Next, the second aspect of the present invention will be described with reference to the embodiments shown in FIGS. 5 through 8.

Embodiment 2-1

FIG. 5 is a flow diagram showing an example for performing a flue gas treatment method according to the second aspect of the present invention.

In FIG. 5, 1500 Nm$^3$/h of flue gas containing 2000 ppm of SO$_X$ and 300 ppm of NO$_X$ and generated by the boiler 1 is cooled to 150° C. by the heat exchanger 2, and led to the gas cooling tower 3. In the gas cooling tower 3, recirculating cooling water is sprayed by the cooling water recirculating pump 9, and the flue gas is cooled to 60° C. and 50 ppm of SO$_X$ in the flue gas is absorbed in the cooling water.

The recirculating cooling water in the gas cooling tower 3 is withdrawn into the spray water storage tank 13 at a rate of 13.5 L/h, and industrial water 21 is replenished according to the amount of the withdrawn water, and the amount of water evaporated or scattered when the recirculating water contacts the flue gas. Thus, water level of the recirculating cooling water at the bottom of the gas cooling tower 3 is kept constant, and the pH of the recirculating cooling water is kept at about 1.

On the other hand, 3.6 kg/h of NH$_3$ gas which has been supplied from the ammonia storage tank 11 is mixed in the line mixer 14 with 16 Nm$^3$/h of compressed air which has been supplied from the compressor 12 and cooled by the after-cooler.

The temperature of the ammonia mixed air is adjusted by the mixed gas heater (not shown), and the ammonia mixed air is supplied to the two-fluid nozzle 5, and then sprayed together with 26.5 L/h of the spray water supplied from the spray pump 18 in the form of two-fluid mixture. NH$_3$ in the mixed gas is dissolved partially in the spray water, and hence the spray water is sprayed into the gas as an ammonia dissolved liquid. The Sauter mean diameter of the sprayed droplets is 15 μm, and water content in the sprayed water is evaporated completely, and thus dissolved components in the sprayed water are evaporated, dried and solidified to form a powder whose main components are ammonium sulfate and ammonium nitrate.

After the two-fluid mixing spray of the spray water and the ammonia mixed air, the flue gas is irradiated with electron beam of 2 kGy from the electron accelerator 30, and 85% of SO$_X$ and 15% of NO in the flue gas led to the process vessel 4 react with NH$_3$ and are converted to a product powder whose main components are ammonium sulfate and ammonium nitrate. The flue gas discharged from the process vessel 4 and containing 10.9 g/Nm$^3$ of product dust comprising a product produced by the reaction and a product produced by evaporating, drying and solidifying the dissolved components in the sprayed water, 290 ppm of the remaining SO$_X$, 155 ppm of the remaining NO, and 100 ppm Of NO$_2$ produced by oxidization of NO, and 150 ppm of NH$_3$ is led to the electrostatic precipitator 6.

99.8% of product dust in the flue gas is collected in the electrostatic precipitator 6, and 14.6 kg/h of the reaction product powder 34 is discharged from the bottom of the electrostatic precipitator 6. The concentration of the product dust in the flue gas is 22 mg/Nm$^3$, and the flue gas is pressurized by the flue gas pressurizing fan 10, and then led to the gas absorption tower 7. In the gas absorption tower 7, the absorption liquid is sprayed by the absorption liquid recirculating pump 20, and about 30% of SO$_X$ and about 25% of NO$_2$ in the flue gas led to the gas absorption tower 7 are absorbed in the absorption liquid, and NH$_3$ and the product dust are absorbed and collected by the absorption liquid as well. Consequently, the flue gas contains 200 ppm of SO$_X$, 230 ppm of NO$_X$ (155 ppm of NO and 75 ppm of NO$_2$), 5 ppm of NH$_3$ and 20 mg/Nm$^3$ of product dust, and the treated flue gas 33 is discharged from the top of the gas absorption tower 7 to the atmosphere.

As a result, 90% of a relatively high desulfurization rate is achieved with irradiation of a small dose of electron beam of 2 kGy and under low concentration of leak ammonia of 5 ppm. However, the denitration rate is limited to about 25% in the entire process.

The absorption liquid in the gas absorption tower 7 is stored temporarily in the absorption liquid storage tank 8 from which the absorption liquid is withdrawn to the spray water storage tank 13 at a rate of 13.0 L/h, and industrial water 21 is replenished to the absorption liquid storage tank 8 according to the amount of the withdrawn water, and the amount of water evaporated or scattered when the absorption liquid contacts the flue gas. At this time, the total concentration by mass of ions resulted from SO$_X$, NO$_X$, and NH$_3$ absorbed in the absorption liquid is about 6%. Further, most of ions resulted from SO$_X$ absorbed in the absorption liquid is SO$_3^{2-}$.

13.5 L/h of the withdrawn liquid from the gas cooling tower 3 and 13.0 L/h of the withdrawn liquid from the gas absorption tower 7 are supplied to the spray water storage tank 13 as described above, and NH$_3$ gas is supplied from the ammonia diffusion pipe 16 into the spray water storage tank 13 such that the pH of the spray water is adjusted in the range of 3 to 5. Further, in order to oxidize SO$_3^{2-}$ to SO$_4^{2-}$ in the spray water storage tank 13, air is supplied to an aeration diffusing pipe 39 by an aeration blower 42. 1.3 kg/h of ammonium compounds are dissolved in 26.5 L/h of the spray water, and this ammonium compounds are dried and solidified by evaporation of the sprayed water to produce a product powder, and this product powder is collected together with a product powder produced by the reaction in the electrostatic precipitator 6.

Embodiment 2-2

Figure 6:
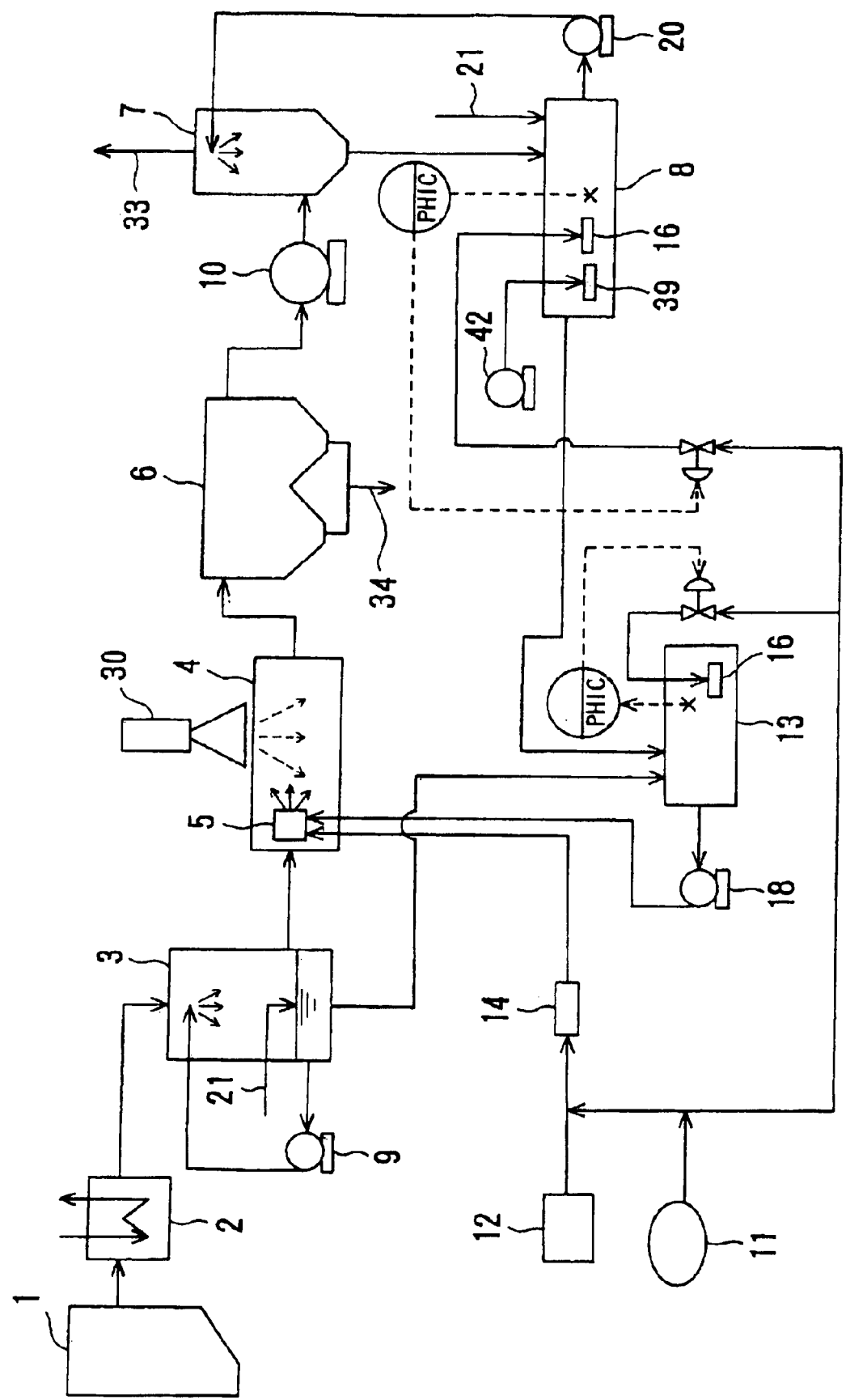
FIG. 6 is a flow diagram showing another example for performing a flue gas treatment method according to the second aspect of the present invention.

FIG. 6 is a flow diagram showing another example for performing a flue gas treatment method according to the second aspect of the present invention. In this example, the structure from the boiler to the process vessel is the same as that of FIG. 5.

However, the property of the spray water sprayed by the two-fluid nozzle, and the amount of product powder discharged from the process vessel and contained in the flue gas are different. Specifically, 2.6 kg/h of ammonium compounds are dissolved in 26.5 L/h of the spray water sprayed by the two-fluid nozzle, and the flue gas led to the electrostatic precipitator contains 290 ppm of SO$_X$, 155 ppm of NO, 100 ppm of NO$_2$, 150 ppm of NH$_3$ and 11.8 g/Nm$^3$ of a by-product powder.

In FIG. 6, the flue gas discharged from the process vessel 4 is led to the electrostatic precipitator 6. 99.8% of product dust in the flue gas is collected in the electrostatic precipitator 6, and 16.0 kg/h of the reaction product powder 34 is discharged from the bottom of the electrostatic precipitator 6. The concentration of product dust in the flue gas is 22 mg/Nm$^3$, and the flue gas is pressurized by the flue gas pressurizing fan 10, and then led to the gas absorption tower 7. In the gas absorption tower 7, the absorption liquid is sprayed by the absorption liquid recirculating pump 20, and about 80% of $SO_X$ and about 70% of $NO_X$ in the flue gas led to the gas absorption tower 7 are absorbed in the absorption liquid, and $NH_3$ and the product dust are absorbed and collected by the absorption liquid as well. Consequently, the flue gas contains 60 ppm of $SO_X$, 185 ppm of $NO_X$ (155 ppm of NO and 30 ppm of $NO_2$), 5 ppm of $NH_3$ and 20 mg/$Nm^3$ of product dust, and the treated flue gas 33 is discharged from the top of the gas absorption tower 7 to the atmosphere.

As a result, 97% of a relatively high desulfurization rate is achieved with irradiation of a small dose of electron beam of 2 kGy and under low concentration of leak ammonia of 5 ppm. Further, the denitration rate is increased to about 40%.

The absorption liquid in the gas absorption tower 7 is stored temporarily in the absorption liquid storage tank 8 from which the absorption liquid is withdrawn to the spray water storage tank 13 at a rate of 13.0 L/h, and industrial water 21 is replenished to the absorption liquid storage tank 8 according to the amount of the withdrawn water, and the amount of water evaporated or scattered when the absorption liquid contacts the flue gas. In the absorption liquid storage tank 8, $SO_3^{2-}$ in the absorption liquid is oxidized to $SO_4^{2-}$ by air supplied to the aeration diffusing pipe 39 by the aeration blower 42, and the pH of the absorption liquid is adjusted in the range of 3 to 5 by supplying $NH_3$ by the ammonia diffusion pipe 16. At this time, the total concentration by mass of ions resulted from $SO_X$, $NO_X$, and $NH_3$ absorbed in the absorption liquid is about 14%.

13.5 L/h of the withdrawn liquid from the gas cooling tower 3 and 13.0 L/h of the withdrawn liquid from the gas absorption tower 7 are supplied to the spray water storage tank 13, and $NH_3$ gas is supplied from the ammonia diffusion pipe 16 into the spray water storage tank 13 such that the pH of the spray water is adjusted in the range of 3 to 5. Ammonium compounds are dissolved in the spray water, and this ammonium compounds are dried and solidified by evaporation of the sprayed water to produce a product powder, and this product powder is collected together with a product powder produced by the reaction in the electrostatic precipitator 6.

Embodiment 2-3

Figure 7:
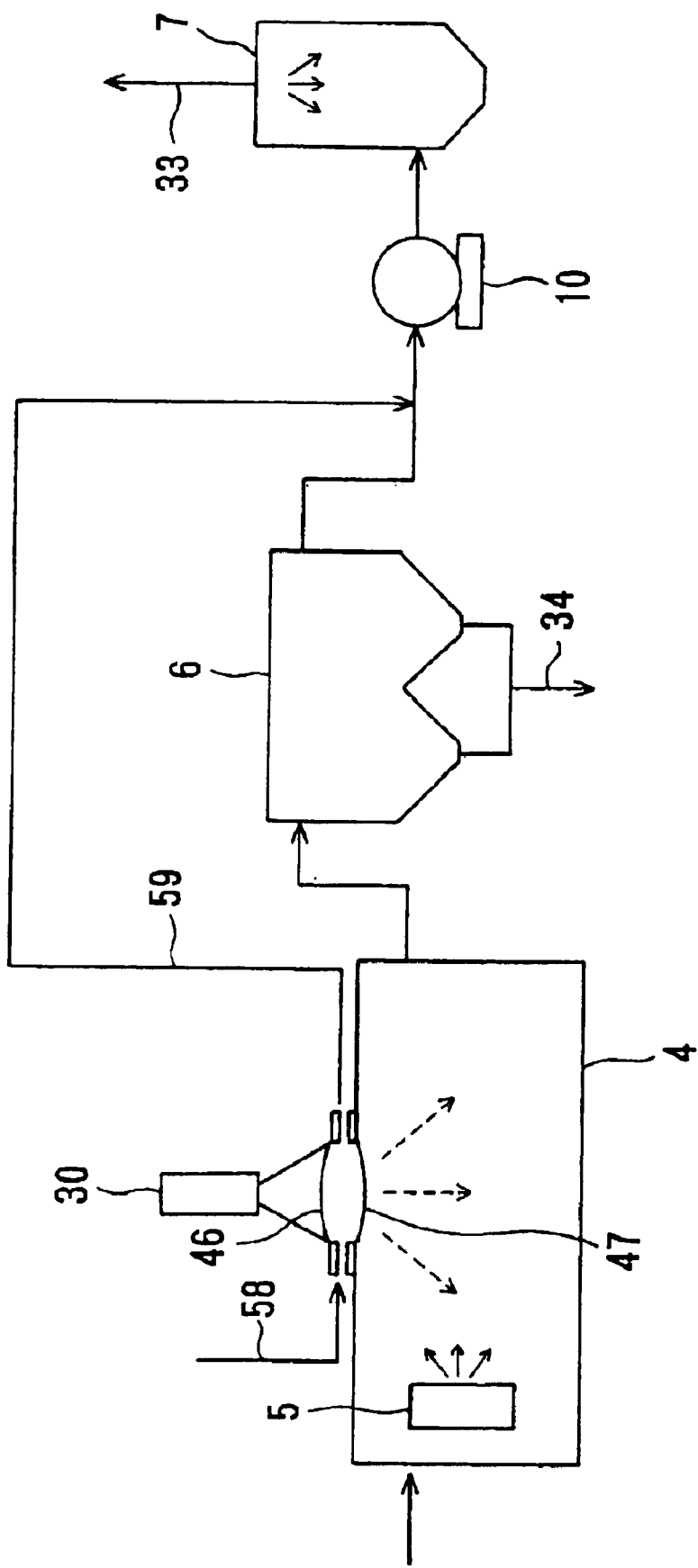
FIG. 7 is a partial flow diagram showing still another example for performing a flue gas treatment method according to the second aspect of the present invention.

FIG. 7 is a partial flow diagram showing still another example for performing a flue gas treatment method according to the second aspect of the present invention.

The structure of FIG. 7 is the same as that of FIG. 6, except that cooling air 59 (hereinafter referred to as air after cooling window foil) after cooling an accelerator-side window foil 46 and a process vessel-side window foil 47 is mixed into the flue gas from the inlet of the flue gas pressurizing fan 10. In FIG. 7, the parts or components identical to those in FIG. 6 are omitted from the drawing. Therefore, the structure in FIG. 7 from the boiler to the process vessel is the same as the structures in FIGS. 5 and 6. The property of the spray water sprayed by the two-fluid nozzle 5, and the amount of product powder discharged from the process vessel 4 and contained in the flue gas are different. Specifically, 2.9 kg/h of ammonium compounds are dissolved in 26.5 L/h of the spray water sprayed by the two-fluid nozzle 5, and the flue gas led to the electrostatic precipitator contains 290 ppm of $SO_X$, 155 ppm of $N_2$, 100 ppm of $NO_2$, 150 ppm of $NH_3$ and 12.1 g/$Nm^3$ of a by-product powder. In FIG. 7, cooling air before cooling the accelerator-side window foil 46 and the process vessel-side window foil 47 is represented by the reference numeral 58, and the cooling air after cooling the accelerator-side window foil 46 and the process vessel-side window foil 47 is represented by the reference numeral 59.

The flue gas discharged from the process vessel 4 is led to the electrostatic precipitator 6, and 99.8% of product dust in the flue gas is collected by the electrostatic precipitator 6, and 16.3 kg/h of a reaction product powder 34 is discharged from the bottom of the electrostatic precipitator 6. After the concentration of product dust in the flue gas becomes 22 mg/$Nm^3$, the flue gas is mixed with 200 $Nm^3$/h of the air 59 after cooling window foil which contains ozone produced by irradiation of electron beam from the electron accelerator 30. As a result, a part of NO in the flue gas is oxidized $NO_2$, and the concentrations of NO and $NO_2$ become 500 ppm and 205 ppm, respectively.

The flue gas mixed with the air 59 after cooling window foil is pressurized by the flue gas pressurizing fan 10, and then led to the gas absorption tower 7. In the gas absorption tower 7, as with FIG. 6, the absorption liquid is sprayed by the absorption liquid recirculating pump 20, and about 80% of $SO_X$ and about 70% of $NO_2$ in the flue gas led to the gas absorption tower 7 are absorbed in the absorption liquid, and $NH_3$ and the product dust are absorbed and collected by the absorption liquid as well. Consequently, the flue gas 33 contains 60 ppm of $SO_X$, 110 ppm of $NO_X$ (50 ppm of NO and 60 ppm of $NO_2$), 5 ppm of $NH_3$ and 20 mg/$Nm^3$ of product dust, and the treated flue gas 33 is discharged from the top of the gas absorption tower 7 to the atmosphere.

As a result, 97% of a relatively high desulfurization rate is achieved with irradiation of a small dose of electron beam of 2 kGy and under low concentration of leak ammonia of 5 ppm. Further, the denitration rate is increased to about 65%.

As shown in FIG. 6, the absorption liquid in the gas absorption tower 7 is stored temporarily in the absorption liquid storage tank 8 from which the absorption liquid is withdrawn to the spray water storage tank 13 at a rate of 13.0 L/h, and industrial water 21 is replenished to the absorption liquid storage tank 8 according to the amount of the withdrawn water, and the amount of water evaporated or scattered when the absorption liquid contacts the flue gas. In the absorption liquid storage tank 8, $SO_3^{2-}$ in the absorption liquid is oxidized to $SO_4^{2-}$ by air supplied to the aeration diffusing pipe 39 by the aeration blower 42, and the pH of the absorption liquid is adjusted in the range of 3 to 5 by supplying $NH_3$ by the ammonia diffusion pipe 16. At this time, the total concentration by mass of ions resulted from $SO_X$, $NO_X$, and $NH_3$ absorbed in the absorption liquid is about 16%.

13.5 L/h of the withdrawn liquid from the gas cooling tower 3 and 13.0 L/h of the withdrawn liquid from the gas absorption tower 7 are supplied to the spray water storage tank 13, and $NH_3$ gas is supplied from the ammonia diffusion pipe 16 into the spray water storage tank 13 such that the pH of the spray water is adjusted in the range of 3 to 5. Ammonium compounds are dissolved in the spray water, and this ammonium compounds are dried and solidified by evaporation of the sprayed water to produce a product powder, and this product powder is collected together with a product powder produced by the reaction in the electrostatic precipitator 6.

FIG. B is a partial flow diagram showing another example for oxidizing $SO_3^{2-}$ in the absorption liquid to $SO_4^{2-}$, the absorption liquid being circulated and used in a gas absorption tower.

Figure 8:
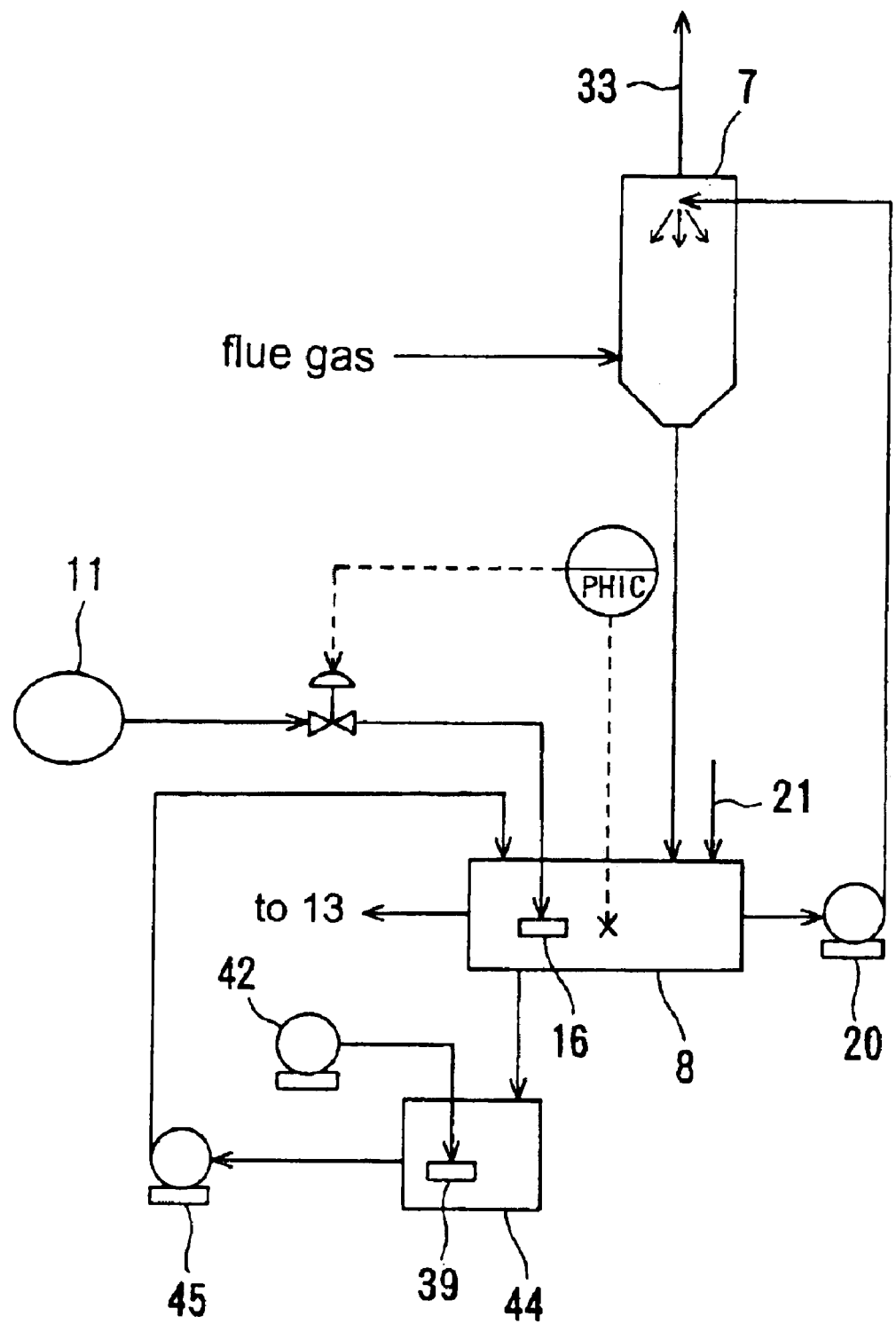
FIG. 8 is a partial flow diagram showing another example for oxidizing an absorption liquid in a gas absorption tower.

The apparatus shown in FIG. 8 is operated in the same manner as that of FIG. 6, except that a part of the absorption liquid is withdrawn into an aeration tank 44, and $SO_3^{2-}$ in the absorption liquid is oxidized to $SO_4^{2-}$ by air supplied to the aeration diffusing pipe 39 by the aeration blower 42, and the withdrawn absorption liquid is returned to the absorption liquid storage tank 8 by an absorption liquid return pump 45.

According to the second aspect of the present invention, by adjusting process variables such as the amount of injected $NH_3$ in the section of the ammonia injection process, the ratio of $SO_X$ and $NH_3$ remaining in the flue gas discharged from the section of the electron beam process is properly adjusted, and by providing a gas absorption tower at the downstream side of the section of the electron beam process, $SO_X$ is absorbed together with $NH_3$ in the gas absorption tower. Thus, the concentration of salts in the absorption liquid can be increased, the amount of waste water withdrawn to the outside of the system can be reduced, and the concentration of leak ammonia can be reduced without requiring chemicals such as sulfuric acid other than $NH_3$, and hence treatment of combustion exhaust gas can be efficiently performed.

According to the third aspect of the present invention, before injecting $NH_3$ into the flue gas containing $SO_X$, the flue gas is brought into contact with cooling water, while after recovering ammonium compounds produced by a reaction of $SO_X$ and $NH_3$, the flue gas is brought into contact with an absorption liquid to remove the remaining $NH_3$ contained in the flue gas, and a part of the cooling water is withdrawn and used as make-up water of the absorption liquid.

When the flue gas containing $SO_X$ is brought into contact with cooling water, a part of $SO_X$ in the flue gas is dissolved as $SO_3^{2-}$ or $SO_4^{2-}$ in the cooling water to lower a pH of the cooling water to less than 7. On the other hand, as described above, when the flue gas from which the product has been recovered in the section of the ammonia injection process is brought into contact with the absorption liquid to absorb unreacted $NH_3$, the $NH_4^+$ concentration in the absorption liquid is gradually increased, and thus the pH of the absorption liquid is increased. Although make-up water whose amount corresponds to the amount of the withdrawn water plus the amount of the evaporated water is supplied to the absorption liquid, if the cooling water which has contacted the flue gas is used as the make-up water, an increase of the pH of the absorption liquid can be suppressed. Thus, a lowering of the absorption efficiency of $NH_3$ in the flue gas by the absorption liquid can be suppressed.

As described above, the effect of lowering the pH in the case where $SO_X$ is dissolved in the absorption liquid in the form of $SO_4^{2-}$ is greater than that in the case where $SO_X$ is dissolved in the form of $SO_3^{2-}$, and hence the effect of suppression of lowering the absorption efficiency of $NH_3$ when $SO_4^{2-}$ is dissolved is also large. Therefore, $SO_3^{2-}$ in the cooling water is oxidized to $SO_4^{2-}$ by a means such as aeration, and this cooling water is used for make-up water to thus increase the effect of suppression of lowering the absorption efficiency of $NH_3$ remarkably.

On the other hand, in the ammonia injection process, the lower the temperature of the flue gas is, the higher the reactivity in which $SO_X$ reacts with injected $NH_3$ is. Therefore, it is desirable that when the flue gas contacts the cooling water, the temperature of the flue gas is as low as possible. Thus, it is desirable to increase the amount of the cooling water which contacts the flue gas, and this is realized by recirculating and using the cooling water. In this case, a part of the recirculating cooling water may be withdrawn and the withdrawn water may be utilized as make-up water of the absorption liquid. In this manner, by withdrawing a part of the recirculating cooling water, SS concentration in the cooling water can be prevented from increasing unlimitedly to thus prevent circulation and use of the cooling water from being hindered.

In the boiler combustion flue gas generated by combustion of coal or heavy oil, $SO_X$ concentration contained in the flue gas is normally in the range of 100 ppm to several thousands ppm. $SO_X$ of several ppm to several tens ppm is removed by the cooling water which is recirculated and used. In the section of the ammonia injection process, in the narrow sense, except the contact portion with the absorption liquid, if irradiation of electron beam is not performed, $NH_3$ of hundred and several tens ppm to several hundreds ppm remains normally, and is reduced to several ppm to several tens ppm by contact with the absorption liquid. Theoretically, because $SO_4^{2-}$ corresponding to 1 ppm of $SO_X$ can react with about 2 ppm of $NH_3$, $SO_3^{2-}$ and/or $SO_4^{2-}$ dissolved in the cooling water, even if $SO_3^{2-}$ in the cooling water is oxidized to $SO_4^{2-}$, is not sufficient to react with $NH_3$ to be absorbed in the absorption liquid.

In order to compensate for this, sulfuric acid may be supplied, in addition to the make-up water comprising a part of the withdrawn cooling water. In this case, according to the present invention, the amount of sulfuric acid to be used can be suppressed compared to the conventional technology. Alternatively, by irradiating the flue gas with electron beam after injection of $NH_3$, the leak ammonia remaining in the flue gas after recovery of the reaction product can be suppressed to such concentration as to be removed by $SO_3^{2-}$ and/or $SO_4^{2-}$ contained in the make-up water comprising a part of the withdrawn cooling water. Furthermore, by suppressing the amount of $NH_3$ to be injected in the section of the ammonia injection process in the narrow sense, the concentration of leak ammonia before the flue gas contacts the absorption liquid is suppressed, the concentration of the remaining $SO_X$ is increased, a part of $SO_X$ is dissolved in the absorption liquid, and the produced $SO_3^{2-}$ and/or $SO_4^{2-}$ is caused to contribute to suppression of increase of the pH. Therefore, the amount of sulfuric acid to be used can be further suppressed.

Embodiment 3

Next, the third aspect of the present invention will be described with reference to the embodiments shown in FIGS. 9 through 11.

Embodiment 3-1

Figure 9:
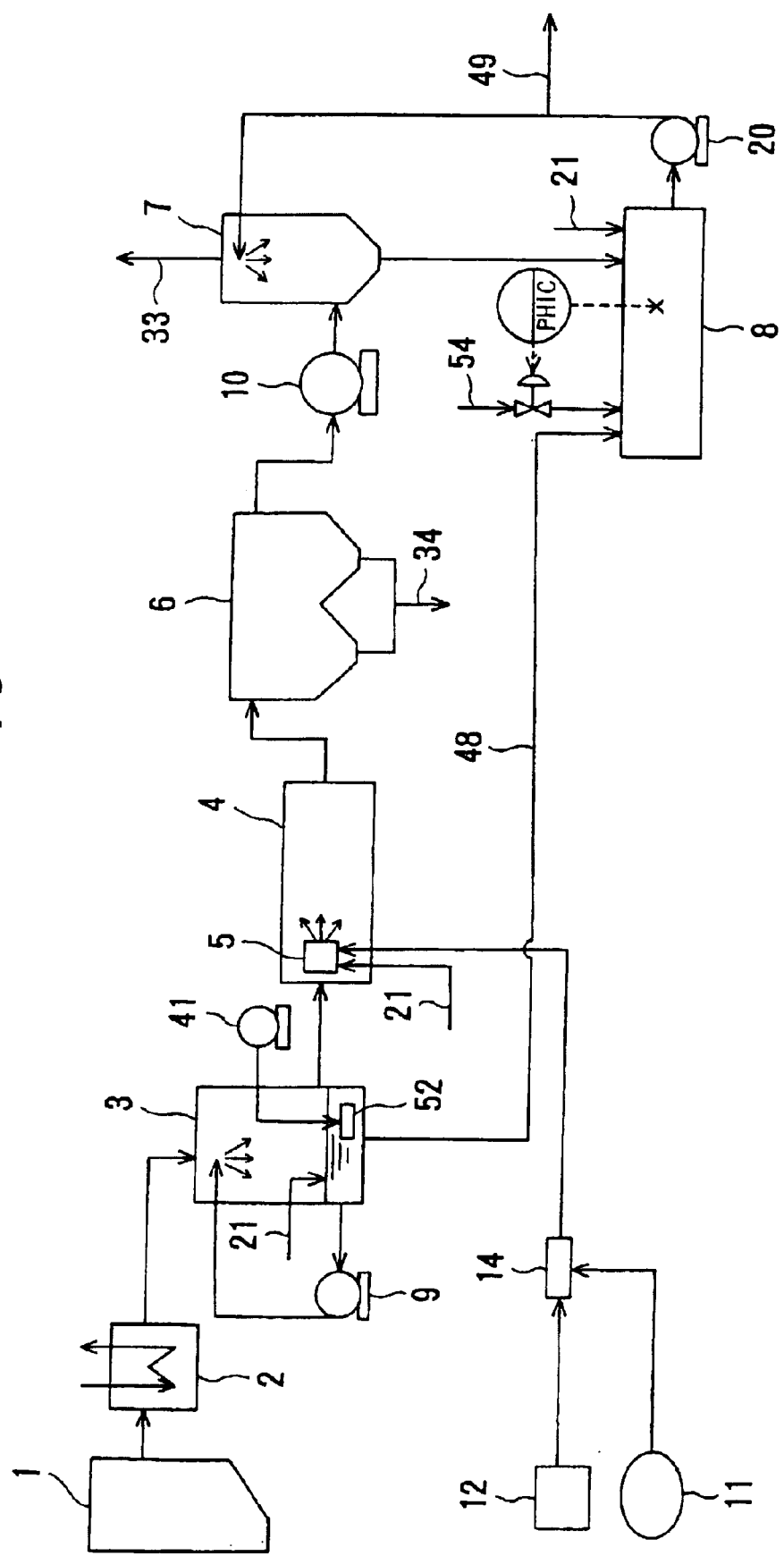
FIG. 9 is a flow diagram showing an example of a flue gas treatment apparatus according to a third aspect of the present invention.

FIG. 9 is a flow diagram showing an example of a flue gas treatment apparatus according to the third aspect of the present invention.

In FIG. 9, 1500 $Nm^3/h$ of flue gas containing 1500 ppm of $SO_X$ and generated in the boiler 1 is cooled to 150° C. by the heat exchanger 2, and led to the gas cooling tower 3. In the gas cooling tower 3, recirculating cooling water is sprayed by the cooling water recirculating pump 9, and the flue gas is cooled to 60° C. and 50 ppm of $SO_X$ in the flue gas is absorbed in the cooling water. The flue gas discharged from the gas cooling tower 3 is led to the process vessel 4.

The recirculating cooling water is gradually stored in the storage portion at the bottom of the gas cooling tower 3, and air supplied from the aeration blower 41 is supplied to this cooling water by the aeration diffusing pipe 52 to thus oxidize $SO_3^{2-}$ in the cooling water to $SO_4^{2-}$. The recirculating cooling water in the gas cooling tower 3 is withdrawn into the absorption liquid storage tank 8 at a rate of 60 L/h, and industrial water 21 is replenished according to the amount of the withdrawn water, and the amount of water evaporated or scattered when the recirculating water contacts the flue gas. Thus, water level of the recirculating cooling water in the storage portion at the bottom of the gas cooling tower 3 is kept constant, and the pH of the recirculating cooling water is kept at about 1.

On the other hand, 2.9 kg/h of $NH_3$ gas which has been supplied from the ammonia storage tank 11 is mixed in the line mixer 14 with 11 $Nm^3/h$ of compressed air which has been supplied from the compressor 12, and is supplied to the two-fluid nozzle 5, and then sprayed together with 19 L/h of industrial water 21 in the form of two-fluid mixture from the two-fluid nozzle 5. At this time, $NH_3$ in the mixed gas is dissolved partially in the industrial water, and hence the spray water is sprayed into the gas as droplets of ammonia dissolved liquid.

By the two-fluid mixing spray of this industrial water and the ammonia mixed air, the $SO_X$ concentration in the flue gas is reduced to 160 ppm, and the flue gas contains 10.3 kg/h of a by-product powder whose main component is produced ammonia sulfate, and 210 ppm of remaining $NH_3$. This flue gas is led to the electrostatic precipitator 6, 99.7% of the by-product 34 in the flue gas is collected, and then the flue gas is led to the gas absorption tower 7 after being pressurized by the flue gas pressurizing fan 10.

In the gas absorption tower 7, the absorption liquid stored in the absorption liquid storage tank B is sprayed from the top of the gas absorption tower 7 by the absorption liquid recirculating pump 20. The make-up water 48 comprising a part of the cooling water withdrawn from the gas cooling tower 3 is supplied to absorption liquid storage tank 8, and sulfuric acid 54 is supplied to the absorption liquid storage tank 8 so that the pH of the absorption liquid becomes about 2. On the other hand, a part of the absorption liquid is withdrawn as withdrawn liquid 49 from a branch line in the absorption liquid circulation line so that the liquid level in the absorption liquid storage tank 8 is kept constant.

In the gas absorption tower 7, $SO_X$ in the flue gas 33 is reduced to 150 ppm, $NH_3$ in the flue gas 33 is also reduced to 10 ppm, and a part of the by-product powder contained in the flue gas is trapped in the absorption liquid to allow dust concentration to be 20 mg/h. In this operation, the amount of supplied sulfuric acid 54 is 0.5 kg/h on average, and the withdrawn liquid 49 containing about 1% of ammonium compounds composed mainly of ammonia sulfate is discharged at a rate of 40 L/h to the outside of the system.

Embodiment 3-2

Figure 10:
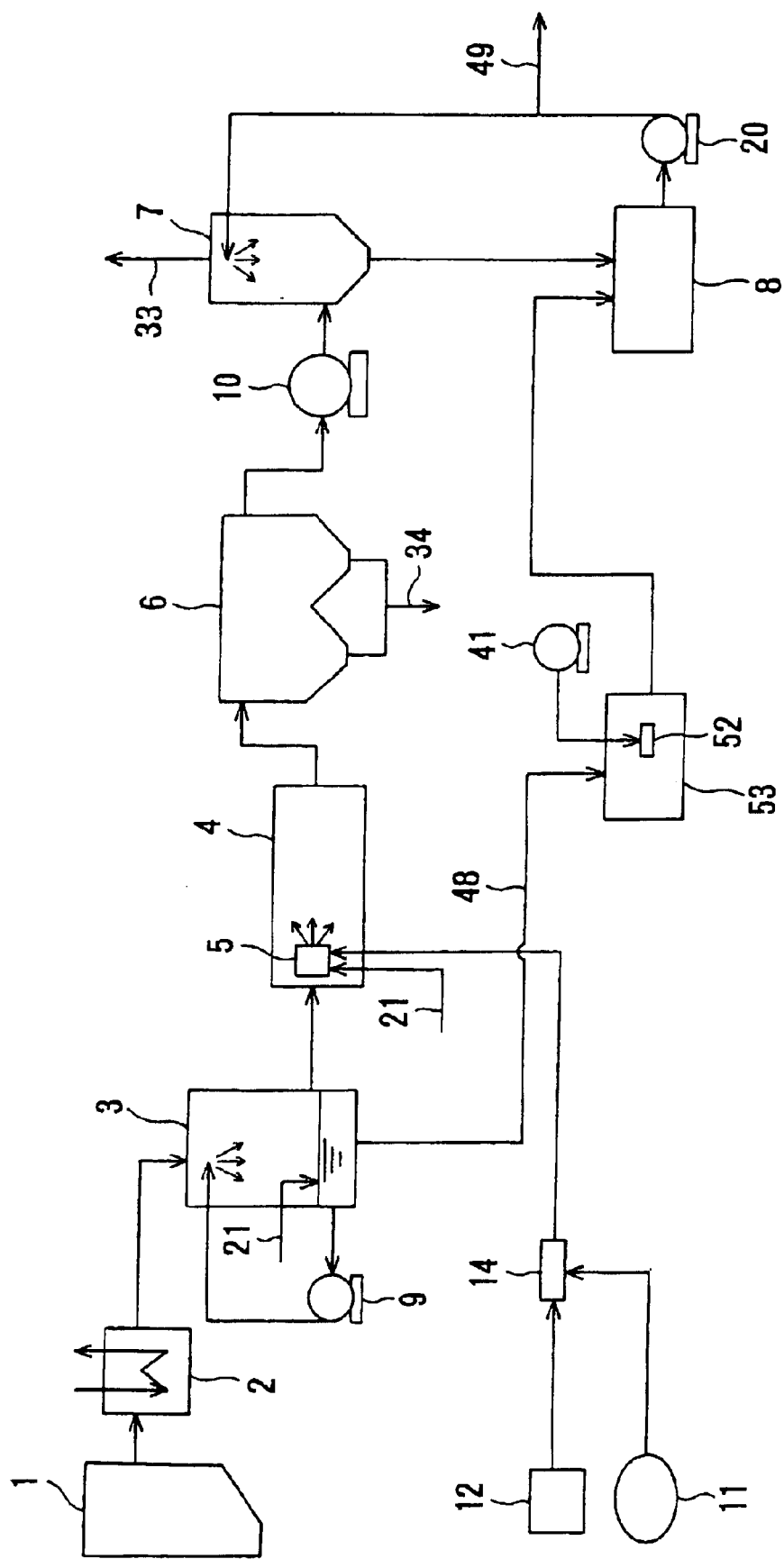
FIG. 10 is a flow diagram showing another example of a flue gas treatment apparatus according to the third aspect of the present invention.

FIG. 10 is a flow diagram showing another example of a flue gas treatment apparatus according to the third aspect of the present invention.

In FIG. 10, 1500 $Nm_3/h$ of flue gas containing 1500 ppm of $SO_X$ and generated in the boiler 1 is cooled to 150° C. by the heat exchanger 2, and led to the gas cooling tower 3. In the gas cooling tower 3, recirculating cooling water is sprayed by the cooling water recirculating pump 9, and the flue gas is cooled to 60° C. and 30 ppm of $SO_X$ in the flue gas is absorbed in the cooling water. The flue gas discharged from the gas cooling tower 3 is led to the process vessel 4.

The recirculating cooling water is gradually stored in the storage portion at the bottom of the gas cooling tower 3 from which the cooling water is withdrawn to an oxidization tank 53 at a rate of 36 L/h, and industrial water 21 is replenished to the gas cooling tower 3 according to the amount of the withdrawn water, and the amount of water evaporated or scattered when the cooling water contacts the flue gas. Thus, water level of the recirculating cooling water in the storage portion at the bottom of the gas cooling tower 3 is kept constant, and the pH of the recirculating water is kept at about 1.5. Air supplied from the aeration blower 41 is supplied to the cooling water in the oxidization tank 53 from the aeration diffusing pipe 52 to thus oxidize $SO_3^{2-}$ in the cooling water to $SO_4^{2-}$. This cooling water is sent to the absorption liquid storage tank 8.

On the other hand, 2.6 kg/h of $NH_3$ gas which has been supplied from the ammonia storage tank 11 is mixed in the line mixer 14 with 11 $Nm^3/h$ of compressed air which has been supplied from the compressor 12, and is supplied to the two-fluid nozzle 5, and then sprayed together with 18 L/h of industrial water 21 in the form of two-fluid mixture. At this time, $NH_3$ in the mixed gas is dissolved partially in the industrial water, and hence the spray water is sprayed into the gas as droplets of ammonia dissolved liquid.

By the two-fluid mixing spray of this industrial water and the ammonia mixed air, the $SO_X$ concentration in the flue gas is reduced to 250 ppm, and the flue gas contains 9.8 kg/h of a by-product powder whose main component is produced ammonia sulfate, and 120 ppm of remaining $NH_3$. This flue gas is led to the electrostatic precipitator 6, 99.7% of the by-product in the flue gas is collected, and then the flue gas is led to the gas absorption tower 7 after being pressurized by the flue gas pressurizing fan 10.

In the gas absorption tower 7, the absorption liquid stored in the absorption liquid storage tank 8 is sprayed from the top of the gas absorption tower 7 by the absorption liquid recirculating pump 20. The make-up water 48 comprising a part of the cooling water withdrawn from the gas cooling tower 3 is supplied to absorption liquid storage tank 8. On the other hand, the withdrawn liquid 49 is discharged at a rate of 40 L/h. The liquid level of the absorption liquid storage tank 8 is kept constant by supplying industrial water 21 by the amount obtained by subtracting the amount of the make-up water 48 from the amount of the withdrawn water and the amount of evaporated water in the absorption tower. Further, sulfuric acid 54 is supplied so that the pH of the absorption liquid becomes about 2.

In the gas absorption tower 7, $SO_X$ in the flue gas 33 is reduced to 225 ppm, $NH_3$ in the flue gas 33 is also reduced to 10 ppm, and a part of the by-product powder contained in the flue gas is trapped in the absorption liquid to allow dust concentration to be 20 mg/h. In this operation, the pH of the recirculating water is about 2.5, and the withdrawn liquid 49 containing about 2.0% of ammonium compounds composed of ammonia sulfate is discharged at a rate of 20 L/h to the outside of the system.

Embodiment 3-3

Figure 11:
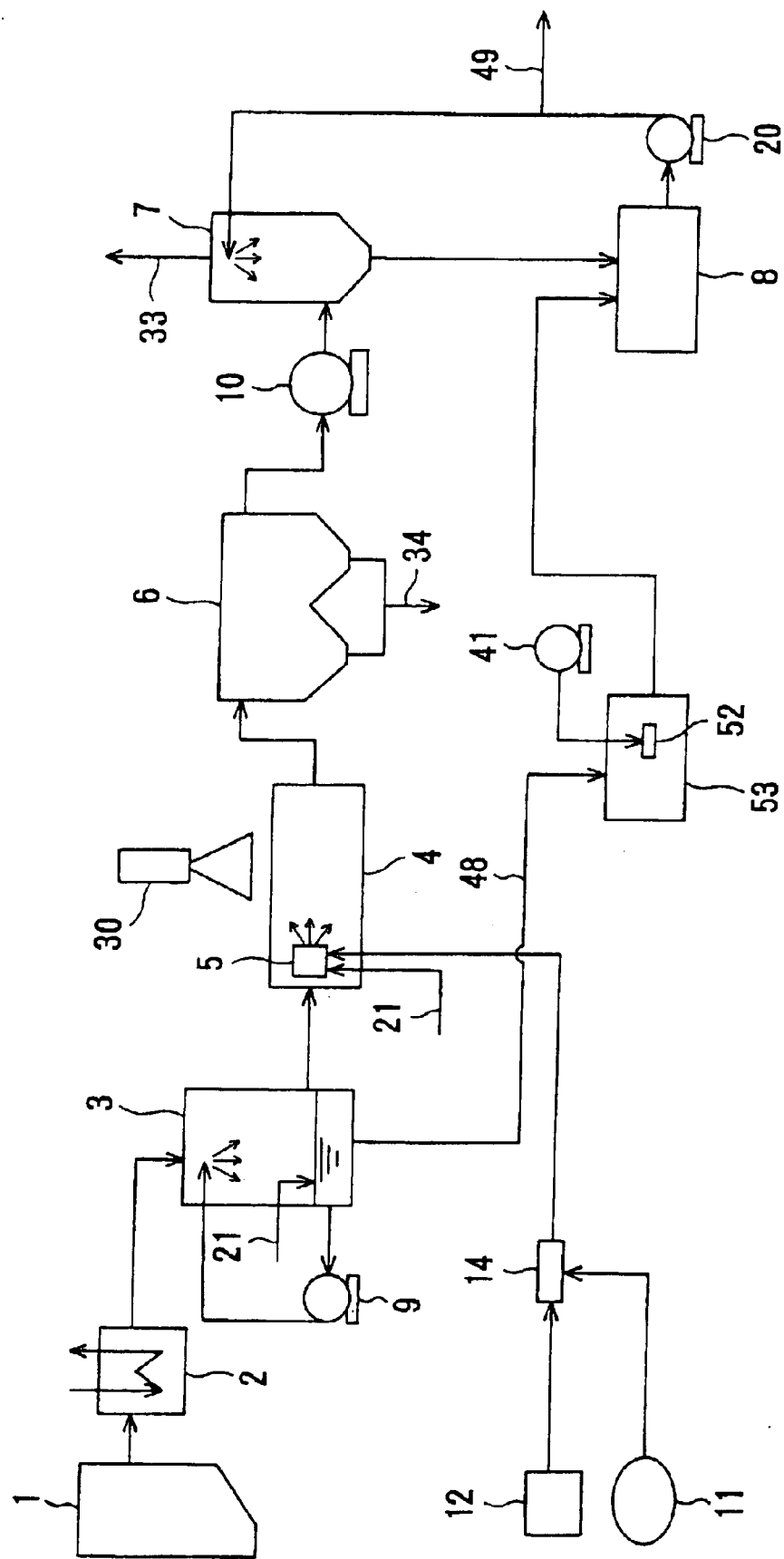
FIG. 11 is a flow diagram showing another example of a flue gas treatment apparatus according to the third aspect of the present invention.

FIG. 11 is a flow diagram showing another example of a flue gas treatment apparatus according to the third aspect of the present invention.

In FIG. 11, 1500 $Nm^3/h$ of flue gas containing 850 ppm of $SO_X$ and generated in the boiler 1 is cooled to 150° C. by the heat exchanger 2, and led to the gas cooling tower 3. In the gas cooling tower 3, recirculating cooling water is sprayed by the cooling water recirculating pump 9, and the flue gas is cooled to 60° C. and 15 ppm of $SO_X$ in the flue gas is absorbed in the cooling water. The flue gas discharged from the gas cooling tower 3 is led to the process vessel 4.

The recirculating cooling water is gradually stored in the storage portion at the bottom of the gas cooling tower 3 from which the cooling water is withdrawn to an oxidization tank 53 at a rate of 18 L/h, and industrial water 21 is replenished to the gas cooling tower 3 according to the amount of the withdrawn water, and the amount of water evaporated or scattered when the cooling water contacts the flue gas. Thus, water level of the recirculating cooling water in the storage portion at the bottom of the gas cooling tower 3 is kept constant, and the pH of the recirculating water is kept at about 1.5. Air supplied from the aeration blower 41 is supplied to the cooling water in the oxidization tank 53 from the aeration diffusing pipe 52 to thus oxidize $SO_3^{2-}$ in the cooling water to $SO_4^{2-}$. This cooling water is sent to the absorption liquid storage tank 8.

On the other hand, 1.7 kg/h of $NH_3$ gas which has been supplied from the ammonia storage tank 11 is mixed in the line mixer 14 with 9 $Nm^3/h$ of compressed air which has been supplied from the compressor 12, and is supplied to the two-fluid nozzle 5, and then sprayed together with 16 L/h of industrial water in the form of two-fluid mixture from the two-fluid nozzle 5. At this time, $NH_3$ in the mixed gas is dissolved partially in the industrial water, and hence the spray water is sprayed into the gas as droplets of ammonia dissolved liquid.

After the two-fluid mixing spray of this industrial water and the ammonia mixed air, the flue gas is irradiated with electron beam of 5 kGy from the electron accelerator 30. As a result, the $SO_X$ concentration in the flue gas is reduced to 55 ppm, and the flue gas contains 6.2 kg/h of a by-product powder whose main component is produced ammonia sulfate, and 60 ppm of remaining $NH_3$. This flue gas is led to the electrostatic precipitator 6, 99.7% of the by-product in the flue gas is collected, and then the flue gas is led to the gas absorption tower 7 after being pressurized by the flue gas pressurizing fan 10.

In the gas absorption tower 7, the absorption liquid stored in the absorption liquid storage tank 8 is sprayed from the top of the gas absorption tower 7 by the absorption liquid recirculating pump 20. The make-up water 48 comprising a part of the cooling water withdrawn from the gas cooling tower 3 is subjected to an aeration treatment in the oxidization tank 53 and supplied to the absorption liquid storage tank 8. On the other hand, a part of the absorption liquid is withdrawn as withdrawn liquid 49 from a branch line in the absorption liquid circulation line so that the liquid level in the absorption liquid storage tank 8 is kept constant.

In the gas absorption tower 7, $SO_X$ in the flue gas 33 is reduced to 40 ppm, $NH_3$ in the flue gas 33 is also reduced to 10 ppm, and a part of the by-product powder contained in the flue gas is trapped in the absorption liquid to allow dust concentration to be 20 mg/h. In this operation, the pH of the recirculating water is about 3, and the withdrawn liquid 49 containing about 3.5% of ammonium compounds composed mainly of ammonia sulfate is discharged at a rate of 5 L/h to the outside of the system.

According to the third aspect of the present invention, there is provided a flue gas treatment method and apparatus for removing $SO_X$ by injecting $NH_3$ into flue gas containing $SO_X$ in which the amount of waste water withdrawn to the outside of the system can be reduced, and the concentration of leak ammonia can be finally reduced without requiring chemicals such as sulfuric acid other than $NH_3$, or with a small amount of chemicals to be used.

According to the fourth aspect of the present invention, before injecting $NH_3$ into the flue gas containing $SO_X$, the flue gas is brought into contact with a heat exchange surface cooled to a temperature of not more than water saturation temperature in the flue gas, while after recovering ammonium compounds produced by a reaction of $SO_X$ and $NH_3$, the remaining $NH_3$ contained in the flue gas is removed by bringing the flue gas into contact with the absorption liquid, and the condensed water generated on the heat exchange surface is used as make-up water of the absorption liquid.

When the flue gas containing $SO_X$ is brought into contact with the heat exchange surface cooled to a temperature of not more than water saturation temperature in the flue gas, a part of water content contained in the flue gas is condensed, and a part of $SO_X$ in the flue gas is dissolved in the thus generated condensed water as $SO_3^{2-}$ or $SO_4^{2-}$, and hence the pH of the condensed water becomes normally about 1 to 2. Therefore, if this condensed water is used as make-up water of the absorption liquid, an increase of the pH of the absorption liquid can be suppressed, and hence a lowering of the absorption efficiency of $NH_3$ in the flue gas by the absorption liquid can be prevented.

As described above, the effect of lowering the pH in the case where $SO_X$ is dissolved in the absorption liquid in the form of $SO_4^{2-}$ is greater than that in the case where $SO_X$ is dissolved in the form of $SO_3^{2-}$, and hence the effect of suppression of lowering the absorption efficiency of $NH_3$ when $SO_4^{2-}$ is dissolved is also large. Therefore, $SO_3^{2-}$ in the condensed water is oxidized to $SO_4^{2-}$ by a means such as aeration, and this condensed water is used for make-up water to thus increase the effect of suppression of lowering the absorption efficiency of $NH_3$ remarkably.

Embodiment 4

Next, the fourth aspect of the present invention will be described with reference to the embodiment shown in FIG. 12.

Figure 12:
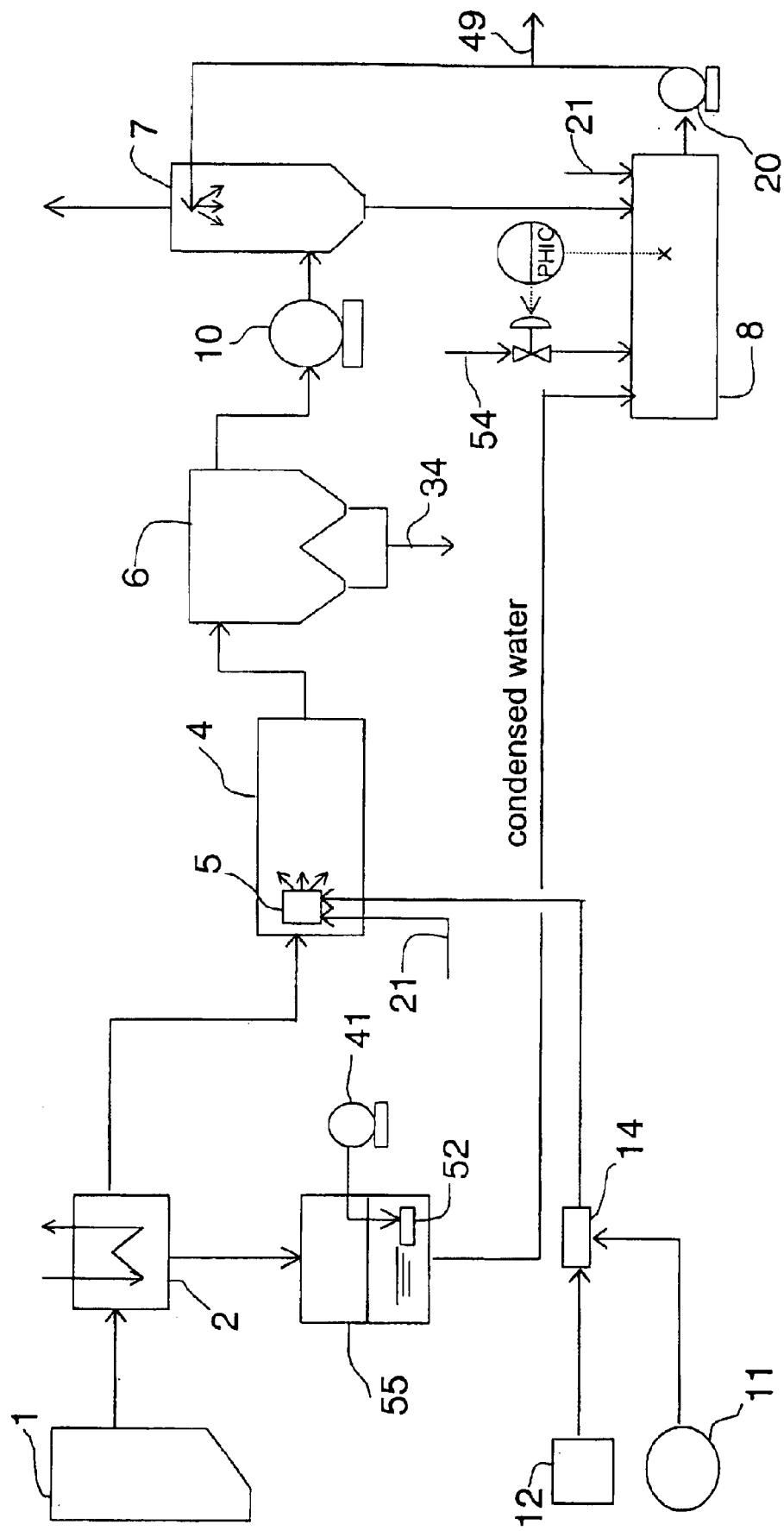
FIG. 12 is a flow diagram showing an example of a flue gas treatment apparatus according to a forth aspect of the present invention.

FIG. 12 is a flow diagram showing an example of a flue gas treatment apparatus according to the fourth aspect of the present invention.

Flue gas containing $SO_X$ and generated in the boiler 1 is led to the heat-exchanger 2 having a gas-contact surface which is cooled to a temperature of not more than water saturation temperature in the flue gas, and a part of water content in the flue gas is condensed in the heat-exchanger 2. The generated condensed water is stored in a condensed water storage tank 55, and air supplied from the aeration blower 41 is supplied to the cooling water by the aeration diffusing pipe 52 to oxidize $SO_3^{2-}$ in the condensed water to $SO_4^{2-}$. On the other hand, $NH_3$ gas which has been supplied from the ammonia storage tank 11 is mixed in the line mixer 14 with compressed air which has been supplied from the compressor 12, and is supplied to the two-fluid nozzle 5, and then sprayed together with industrial water 21 in the form of two-fluid mixture. At this time, $NH_3$ in the mixed gas is dissolved partially in the industrial water, and hence the spray water is sprayed into the gas as droplets of ammonia dissolved liquid.

Then, the flue gas discharged from the process vessel 4 is led to the electrostatic precipitator 6, and a powder of ammonium compounds whose main component is ammonium sulfate produced by a reaction of $SO_X$ and $NH_3$ in the flue gas is collected, and then the flue gas is led to the gas absorption tower 7 after being pressurized by the flue gas pressurizing fan 10.

In the gas absorption tower, the absorption liquid stored in the absorption liquid storage tank 8 is sprayed from the top of the gas absorption tower 7 by the absorption liquid recirculating pump 20. The condensed water is supplied from the condensed water storage tank 55 to the absorption liquid storage tank 8, while the withdrawn liquid 49 is discharged at a rate of 40 L/h. The liquid level of the absorption liquid storage tank 8 is kept constant by supplying industrial water 21 by the amount obtained by subtracting the amount of the condensed water from the amount of the withdrawn water and the amount of evaporated water in the absorption tower. Further, sulfuric acid 54 is supplied so that the pH of the absorption liquid becomes about 2.

According to the fifth aspect of the present invention, there is provided a pH adjusting apparatus by $NH_3$ gas comprising: a supply port for supplying aqueous solution before adjusting a pH of the aqueous solution; a discharge port for discharging the aqueous solution after adjusting a pH of the aqueous solution; a pH adjusting tank having an ammonia diffusing means for diffusing $NH_3$ gas into the aqueous solution held in the tank; a pH measuring device for measuring a pH of the aqueous solution held in the pH adjusting tank; and an ammonia gas supply line having an adjusting valve whose opening degree is controlled on the basis of signals from the pH measuring device.

Conventionally, the method in which a pH of solution is adjusted by adding alkaline substance to aqueous solution has been generally carried out. In this case, normally, as a method for adding alkaline substance, this alkaline substance is once dissolved in water to produce alkaline aqueous solution, and this alkaline aqueous solution is added to an aqueous solution whose pH should be adjusted (hereinafter referred to as pH adjustment object liquid).

Specifically, when the alkaline substance is $NH_3$, in the conventional technology, $NH_3$ is once dissolved in water to produce aqueous ammonia, and then this aqueous ammonia is added to the pH adjustment object liquid. The pH adjustment by this aqueous ammonia is employed for pH adjustment of the absorption liquid in a wet-type ammonia desulfurizing apparatus for absorbing and removing $SO_X$ by bringing gas containing $SO_X$ such as boiler combustion gas into contact with the absorption liquid containing $NH_4^{30}$ whose pH is adjusted to a proper range.

$NH_3$ is produced as pure liquefied ammonia in the industrial productive process of $NH_3$, and $NH_3$ is normally carried as liquefied ammonia or $NH_3$ gas(compressed gas) produced by vaporization of liquefied ammonia into the place where $NH_3$ is used. Therefore, in the pH adjustment by aqueous ammonia, aqueous ammonia producing equipment for producing aqueous ammonia by dissolving $NH_3$ into water is required separately besides ammonia receiving and storage equipment for receiving and storing $NH_3$. Especially, in the facilities having combustion equipment such as a boiler in which a wet-type ammonia desulfurizing apparatus employing pH adjustment by aqueous ammonia is provided, in many cases, a site enough to provide a desulfurizing apparatus cannot be prepared. In such cases, aqueous ammonia producing equipment is provided outside of the facilities, and aqueous ammonia (normally about 20 wt %) is carried in from the outside of the facilities. In such cases, there arises a problem that transport weight of aqueous ammonia is about five times that of pure liquefied ammonia to increase the transportation cost.

Further, in many cases, the pH adjustment object liquid is subjected to a pH adjustment, and further subjected to a treatment such as a filtration. However, there arises a problem that the pH adjustment by aqueous ammonia causes $NH_3$ of alkaline substance to accompany water to thus increase the amount of liquid during process of the pH adjustment, thus requiring a large capability of apparatuses for allowing liquid to pass therethrough in the subsequent stage of the process of the pH adjustment.

According to the present invention, in the case where $NH_3$ is carried in and stored as $NH_3$ gas, the ammonia gas storage tank and the ammonia diffusing means are connected by the ammonia gas supply line so that a pH of the pH adjustment object liquid can be adjusted without complicated equipment such as aqueous ammonia producing equipment in the conventional technology.

Further, in the case where $NH_3$ is carried in and stored as liquefied ammonia, if an ammonia carburetor having a simpler structure than the aqueous ammonia producing equipment is provided, then the ammonia carburetor or an ammonia gas accumulator provided at the downstream side of the ammonia carburetor, and the ammonia diffusing means are connected by the ammonia gas supply line to allow a pH of the pH adjustment object liquid to be adjusted easily.

Further, according to the present invention, since only $NH_3$ is injected into the pH adjustment object liquid so as not to accompany water, the amount of liquid is not increased during the process of the pH adjustment, and it is not necessary in the treatment such as a filtration in the subsequent stage of the process of the pH adjustment to enhance a capability of the apparatus for allowing liquid to pass therethrough.

According to the pH adjusting apparatus of the present invention, as an ammonia diffusing means, by using a diffusion pipe composed of porous material and having many fine pores, $NH_3$ gas can be efficiently dissolved into the pH adjustment object liquid. This porous pipe may be made of ceramic materials, specifically alumina porcelain. The diameters of the pores are preferably in the range of 10 to 500 $\mu$m.

In the pH adjusting apparatus of the present invention, as the adjusting valve, by using an opening and closing valve which is opened by a signal generated when the pH measuring device detects a setting minimum value and is closed by a signal generated when the pH measuring device detects a setting maximum value, the pH of the pH adjustment object liquid can be maintained between the setting maximum value or a value slightly higher than the setting maximum value, and a setting minimum value or a value slightly lower than the setting minimum value.

When the ammonia gas supply line having this opening and closing valve is connected to the ammonia gas storage tank or the ammonia gas accumulator as described above, a pressure in the gas storage tank or the accumulator is normally in the range of about 0.5 to 1.0 MPa, and hence when the opening and closing valve is opened, $NH_3$ gas is injected into liquid at a blow, and the pH of the pH adjustment object liquid exceeds the setting maximum value greatly. This is a serious problem when the pH of the pH adjustment object liquid is needed to be adjusted precisely.

In order to avoid this problem, if the upstream side of the opening and closing valve, i.e. the ammonia gas supply line is connected to the ammonia gas storage tank or the ammonia gas accumulator, then a pressure adjusting means for adjusting a pressure of $NH_3$ gas may be provided between the opening and closing valve, and the gas storage tank or the accumulator. As the pressure adjusting means, a self-actuated decompression valve may be used. Particularly, in the case where the pH adjustment is required to be performed more precisely, it is possible to provide a means, such as a needle valve, for reducing a pressure of $NH_3$ gas at the downstream side of the decompression valve, i.e. between the decompression valve and the ammonia diffusing means.

Further, as the pressure adjusting means, a gas decompression tank having a mechanism for keeping a pressure inside the tank constant may be used. Such gas decompression tank may comprise a tank having a pressure switch for generating a signal when the pressure switch detects a setting maximum value or a setting minimum value, and an opening and closing valve for opening or closing the valve by a signal from the pressure switch.

In the case where the ammonia diffusing means comprises a porous diffusing pipe made of alumina porcelain, it is desirable that $NH_3$ gas pressure in the diffusing pipe is adjusted in the range of water pressure, at the position where the diffusing pipe is provided, +0.1 kPa to 50 kPa.

The pH adjusting apparatus of the present invention is applicable to the flue gas absorption apparatus for absorbing and removing $SO_X$ by bringing flue gas containing $SO_X$ such as boiler combustion flue gas into contact with an absorption liquid containing $NH_4^+$. Specifically, because the absorption liquid is normally circulated and used in the flue gas absorption apparatus, a pH of the absorption liquid is gradually increased with absorption of $SO_X$. In this case, in order to prevent an absorption efficiency of $SO_X$ from being lowered, it is necessary to maintain the pH of the absorption liquid within a proper range, and the pH adjusting device of the present invention may be used to adjust the pH of the absorption liquid.

In this flue gas absorption apparatus, the pH of the absorption liquid is adjusted in a pH adjustment tank provided separately from the gas absorption apparatus in which the flue gas containing $SO_X$ contacts the absorption liquid. Alternatively, an absorption liquid storage portion for storing the absorption liquid may be provided at the bottom of the gas absorption apparatus, and the pH of the absorption liquid stored in the absorption liquid storage portion may be measured by a pH measuring device, and then $NH_3$ gas may be diffused directly to the absorption liquid. In this case, the absorption liquid storage portion constitutes the pH adjustment tank of the present invention.

Next, the fifth aspect of the present invention will be described with reference to FIGS. 13 and 14.

Figure 13:
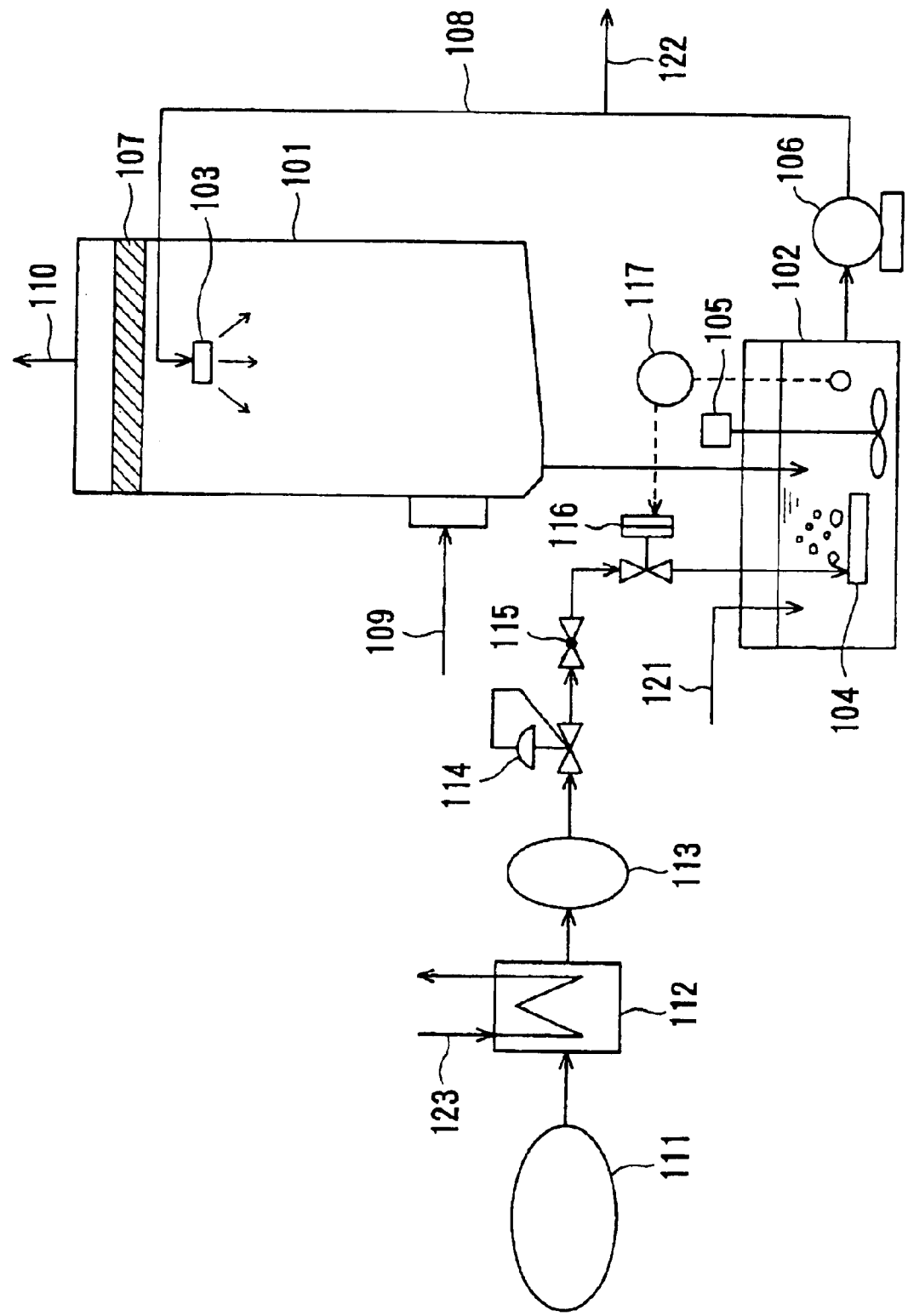
FIG. 13 is a flow diagram showing an example of a flue gas absorption apparatus having a pH adjusting apparatus according to a fifth aspect of the present invention.
Figure 14:
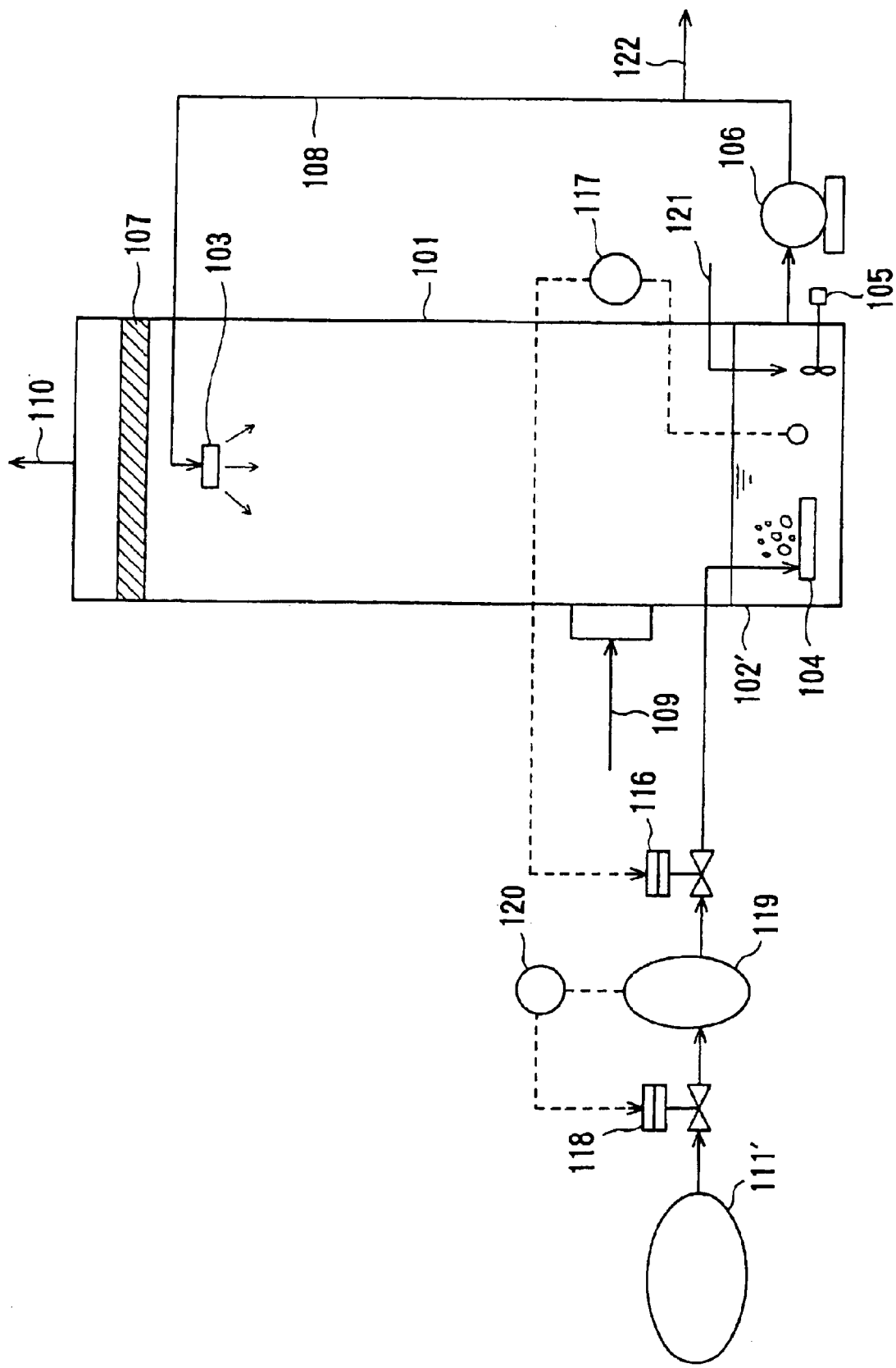
FIG. 14 is a flow diagram showing another example of a flue gas absorption apparatus having the pH adjusting apparatus according to the fifth aspect of the present invention.

FIGS. 13 and 14 are flow diagrams of a flue gas absorption apparatus in which an example of the pH adjusting apparatus by $NH_3$ gas of the present invention is used for pH adjustment of the absorption liquid in the flue gas absorption apparatus.

In the drawings, the reference numeral 101 represents a flue gas absorption tower, the reference numeral 102 a pH adjusting tank, the reference numeral 103 a spray nozzle, the reference numeral 104 an ammonia diffusion pipe, the reference numeral 105 a mixer, the reference numeral 106 an absorption liquid recirculating pump, the reference numeral 107 a mist separator, the reference numeral 108 a recirculating absorption liquid, the reference numeral 109 flue gas at an inlet (before treatment), the reference numeral 110 flue gas at an outlet (after treatment), and the reference numerals 111 to 120 ammonia gas supply system.

With reference to FIG. 13, flue gas 109 which has flowed in from an inlet at the bottom of the flue gas absorption tower 101 is brought into contact with the recirculating absorption liquid 108 sprayed from the spray nozzle 103 provided at the top of the flue gas absorption tower 101 to absorb and remove $SO_X$ in the flue gas by the absorption liquid 108. The purified gas 110 passes through the mist separator 107 provided at the top of the flue gas absorption tower 101 to the atmosphere.

The recirculating absorption liquid 108 is withdrawn from the bottom of the flue gas absorption tower 101 and led to the pH adjusting tank 102 (depth of water of less than 1 m), and $NH_3$ gas injected from the porous ammonia diffusion pipe 104 provided in the pH adjusting tank and made of porcelain is dissolved in the absorption liquid to adjust a pH of the absorption liquid.

$NH_3$ is stored in the ammonia storage tank 111 as liquefied ammonia, and this liquefied ammonia becomes $NH_3$ gas by indirect heat exchange with steam 123 in the ammonia carburetor 112, and this $NH_3$ gas is stored in the ammonia gas accumulator 113 at a pressure ranging from 0.3 to 0.8 MPa. The ammonia gas accumulator 113 is connected to the ammonia diffusion pipe 104 by an ammonia gas supply line having a self-actuated decompression valve 114, a needle valve 115, and an electromagnetic-type opening and closing valve 116. The electromagnetic-type opening and closing valve 116 is opened or closed by a signal from a pH measuring device 117 for measuring a pH of the recirculating absorption liquid 108 in the pH adjusting tank 102.

The pH measuring device 117 generates an opening signal when the pH measuring device 117 detects the state in which a pH of the recirculating absorption liquid 108 reaches a setting minimum value (normally set to a pH about 2 to 5), and a closing signal when the pH measuring device 117 detects the state in which the pH of the recirculating absorption liquid 108 reaches a setting maximum value (normally set to a pH=about 5 to 8). In order to perform measurement and adjustment of the pH properly, the solution in the pH adjusting tank 102 is sufficiently stirred by the mixer 105.

Further, in the self-actuated decompression valve 114, secondary pressure is set to a pressure of about 10 to 100 kPa, and $NH_3$ gas is further decompressed by the needle valve 115 to adjust the pressure of $NH_3$ gas in the ammonia diffusion pipe 104 in the range of 10 to 50 kPa.

The absorption liquid 108 whose pH is adjusted by the pH adjusting tank 102 is supplied to the spray nozzle 103 at the top of the flue gas absorption tower 101 by the absorption liquid recirculating pump 106, and a part of the absorption liquid 108 is withdrawn as withdrawn liquid 122 to the outside of the system. Make-up water 121 is supplied to the pH adjusting tank 102 by a water level adjustment mechanism (comprising a water level gauge and an adjusting valve) to make up water content in this withdrawn liquid 122 and water content lost by vaporization into the flue gas. This withdrawn liquid 122 and the make-up water 121 allow the salt concentration and SS concentration of the recirculating absorption liquid 108 to be suppressed to a proper level or lower.

Next, with reference to FIG. 14, flue gas 109 which has flowed in from an inlet at the bottom of the flue gas absorption tower 101 is brought into contact with the recirculating absorption liquid 108 sprayed from the spray nozzle 103 provided at the top of the flue gas absorption tower to absorb and remove $SO_X$ in the flue gas by the absorption liquid. The purified gas 110 passes through the mist separator 107 provided at the top of the flue gas absorption tower 101 to the atmosphere.

The recirculating absorption liquid 108 is stored in an absorption liquid storage portion 102' (depth of water of less than 1 m) at the bottom of the flue gas absorption tower 101, and $NH_3$ gas injected from the porous ammonia diffusion pipe 104 provided in the absorption liquid storage portion 102' and made of porcelain is dissolved in the absorption liquid 108 to adjust a pH of the absorption liquid.

$NH_3$ is stored as gas in an ammonia gas tank 111' at a pressure ranging from 0.3 to 0.8 MPa. The ammonia gas tank 111' is connected to the ammonia diffusion pipe 104 by an ammonia gas supply line having a first electromagnetic-type opening and closing valve 118, a gas decompression tank 119, and a second electromagnetic-type opening and closing valve 116. The second electromagnetic-type opening and closing valve 116 is opened or closed by a signal from the pH measuring device 117 for measuring a pH of the recirculating absorption liquid 108 in the absorption liquid storage portion 102'.

The pH measuring device 117 generates an opening signal when the pH measuring device 117 detects the state in which a pH of the recirculating absorption liquid 108 reaches a setting minimum value (normally set to a pH=about 2 to 5), and an opening signal when the pH measuring device 117 detects the state in which the pH of the recirculating absorption liquid 108 reaches a setting maximum value (normally set to a pH=about 5 to 8). In order to perform measurement and adjustment of the pH properly, the solution in the absorption liquid storage portion 102' is sufficiently stirred by the mixer 105. The first electromagnetic-type opening and closing valve 118 is opened or closed by a pressure switch 120 provided in the gas decompression tank 119, whereby the interior of the gas decompression tank 119 is adjusted in the range of 10 to 50 kPa. Thus, the pressure of $NH_3$ gas in the ammonia diffusion pipe 104 is adjusted in the range of 10 to 50 kPa.

The absorption liquid 108 whose pH is adjusted by the pH adjusting apparatus is supplied to the spray nozzle 103 at the top of the flue gas absorption tower 101 by the absorption liquid recirculating pump 106, and a part of the absorption liquid 108 is withdrawn as withdrawn liquid 122 to the outside of the system. Make-up water 121 is supplied to the absorption liquid storage portion 102' by a water level adjustment mechanism (comprising a water level gauge and an adjusting valve) to make up water content in this withdrawn liquid and water content lost by vaporization into the flue gas. This withdrawn liquid 122 and the make-up water 121 allow the salt concentration and SS concentration of the recirculating absorption liquid 108 to be suppressed to a proper level or lower.

According to the fifth aspect of the present invention, with the above arrangement, $NH_3$ is introduced into the pH adjusting tank directly to adjust a pH without a process in which $NH_3$ is once dissolved in water to produce aqueous ammonia, and hence the apparatus is economical from a facility viewpoint.

Industrial applicability

The present invention is suitable for a flue gas treatment system in which $SO_X$ contained in combustion flue gas of various fuels such as coal or petroleum can be removed from the gas at high efficiency.

What is claimed is:

1. A flue gas treatment method for removing sulfur oxides in flue gas using ammonia, said flue gas treatment method comprising:

injecting ammonia into flue gas containing sulfur oxides to react sulfur oxides with ammonia to produce ammonium compounds containing ammonium sulfate;

after said injecting step, irradiating the flue gas with an electron beam through a metal foil;

after said irradiating step, recovering the produced ammonium compounds from the flue gas so that sulfur oxides and ammonia remain in the flue gas;

circulating an absorption liquid;

bringing the flue gas into contact with the absorption liquid after said recovering step to remove residual sulfur oxides and ammonia contained in the flue gas;

cooling said metal foil with air;

after said cooling step and before said bringing step, injecting the air into the flue gas; and oxidizing sulfite ions which are dissolved in said absorption liquid during said bringing step.

2. A flue gas treatment method according to claim 1, wherein the amount of said ammonia injected into the flue gas is adjusted so that a pH of said absorption liquid becomes 8 or less without supplying acid substance.

3. A flue gas treatment method according to claim 1, wherein the pH of said absorption liquid is adjusted by supplying ammonia into said absorption liquid.

4. A flue gas treatment method according to claim 3, wherein supply of ammonia into said absorption liquid is performed by diffusion of ammonia gas into said absorption liquid.

5. A flue gas treatment method according claim 1, wherein the flue gas is brought into contact with cooling water before injecting ammonia into the flue gas, and a part of the cooling water which has contacted said flue gas is withdrawn, and then the withdrawn water is supplied as it is or after the dissolved sulfite ions in the withdrawn water are oxidized, as make-up water of said absorption liquid.

6. A flue gas treatment method according to claim 1, wherein before injecting said ammonia into the flue gas, the flue gas is brought into contact with a heat exchange surface which is cooled to a temperature of not more than water saturation temperature in said flue gas, and then the condensed water generated on said heat exchange surface is withdrawn partially or entirely, and the withdrawn water is supplied as make-up water of said absorption liquid as it is or after the dissolved sulfite ions in the withdrawn water are oxidized.

7. A flue gas treatment method according to claim 1, wherein a part of said absorption liquid is withdrawn, and said withdrawn absorption liquid is sprayed into the flue gas before, or simultaneously with, or after injection of ammonia; or after mixing said withdrawn absorption liquid with ammonia.

* * * * *